(12) United States Patent
Yamada et al.

(10) Patent No.: US 12,162,419 B2
(45) Date of Patent: Dec. 10, 2024

(54) VEHICLE SEAT

(71) Applicant: TS TECH CO., LTD., Saitama (JP)

(72) Inventors: Takuro Yamada, Tochigi (JP); Atsushi Yamabe, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

(21) Appl. No.: 18/326,118

(22) Filed: May 31, 2023

(65) Prior Publication Data

US 2023/0303025 A1    Sep. 28, 2023

Related U.S. Application Data

(63) Continuation of application No. 17/351,299, filed on Jun. 18, 2021, now Pat. No. 11,702,024, which is a continuation of application No. 16/344,835, filed as application No. PCT/JP2017/035150 on Sep. 28, 2017, now Pat. No. 11,040,686.

(30) Foreign Application Priority Data

| Nov. 4, 2016 | (JP) | 2016-216090 |
| Jan. 30, 2017 | (JP) | 2017-014369 |
| Feb. 20, 2017 | (JP) | 2017-029330 |

(51) Int. Cl.
*B60R 21/207* (2006.01)
*B60N 2/68* (2006.01)

(52) U.S. Cl.
CPC ............ *B60R 21/207* (2013.01); *B60N 2/682* (2013.01)

(58) Field of Classification Search
CPC .............. B60R 21/207; B60R 21/2313; B60R 2021/23156; B60N 2/682

USPC ................................ 280/730.2, 728.2, 730.1
See application file for complete search history.

(56) References Cited

U.S. PATENT DOCUMENTS

| 5,799,971 A | 9/1998 | Asada |
| 5,845,932 A | 12/1998 | Kimura et al. |
| 5,868,420 A | 2/1999 | Higashiura et al. |
| 5,913,536 A | 6/1999 | Brown |
| 6,220,624 B1 | 4/2001 | Abraham et al. |
| (Continued) | | |

FOREIGN PATENT DOCUMENTS

| JP | H09-132102 | 5/1997 |
| JP | H09-150705 A | 6/1997 |
| (Continued) | | |

OTHER PUBLICATIONS

International Search Report mailed on Dec. 12, 2017 for the corresponding PCT Application No. PCT/JP2017/035150, with partial English translation.

(Continued)

*Primary Examiner* — Amy R Weisberg
*Assistant Examiner* — Caitlin Anne Miller
(74) *Attorney, Agent, or Firm* — Michael Best & Friedrich LLP

(57) ABSTRACT

To improve workability when attaching an airbag module disposed in a side portion of a vehicle seat from a seat back side. A vehicle seat (S) includes: a side frame (13) which constitutes a side portion of a seat back frame (10); a bracket (20) which includes an attachment portion (21) attached to a side surface of the side frame (13) on a seat inner side and a back protrusion portion (22) protruding backward from the attachment portion (21); and an airbag module (30) which includes a retainer (34) fixed to the back protrusion portion (22).

10 Claims, 18 Drawing Sheets

(56) References Cited

U.S. PATENT DOCUMENTS

| | | |
|---|---|---|
| 2006/0175812 A1 | 8/2006 | Abramczyk et al. |
| 2013/0270878 A1 | 10/2013 | Adachi et al. |
| 2015/0123435 A1 | 5/2015 | Adachi et al. |
| 2015/0251571 A1 | 9/2015 | Adachi et al. |
| 2016/0009248 A1 | 1/2016 | Tanabe et al. |
| 2016/0221482 A1 | 8/2016 | Adachi et al. |
| 2018/0147959 A1 | 5/2018 | Adachi et al. |
| 2019/0100121 A1 | 4/2019 | Adachi et al. |
| 2019/0248320 A1 | 8/2019 | Yamada et al. |
| 2021/0316690 A1 | 10/2021 | Yamada et al. |
| 2023/0303025 A1 | 9/2023 | Yamada et al. |

FOREIGN PATENT DOCUMENTS

| | | |
|---|---|---|
| JP | H09-220994 A | 8/1997 |
| JP | H09-315256 A | 12/1997 |
| JP | H10-181500 A | 7/1998 |
| JP | 2000-043669 A | 2/2000 |
| JP | 2012-140044 A | 7/2012 |
| JP | 5669567 B2 | 2/2015 |
| JP | 2015-051770 A | 3/2015 |
| JP | 2016-020142 A | 2/2016 |
| JP | 6880390 B2 | 5/2021 |
| WO | 2000/006426 A1 | 2/2000 |

OTHER PUBLICATIONS

Japanese Office Action mailed on May 28, 2019 for the related Japanese Patent Application No. 2017-014369, with English machine translation.

Japanese Office Action mailed on May 28, 2019 for the related Japanese Patent Application No. 2017-029330, with English machine translation.

Acorn nut Wikipedia page accessed with WaybackMachine from Jul. 10, 2016.

Japanese Office Action mailed on Dec. 19, 2023 from the Japan Patent Office (JPO) for the related Japanese Patent Application No. 2023-042134, with English machine translation.

Chinese Office Action dated Jun. 2, 2024 from the China National Intellectual Property Administration (CNIPA) for the corresponding Chinese Patent Application No. 202210306391.4, with English machine translation.

VEHICLE SEAT

CROSS-REFERENCE TO RELATED APPLICATIONS

This application is a continuation of U.S. patent application Ser. No. 17/351,299, filed on Jun. 18, 2021, which, in turn, is a continuation of U.S. patent application Ser. No. 16/344,835 (now U.S. Pat. No. 11,040,686), filed on Apr. 25, 2019, which, in turn, is a National Stage Entry of PCT Application Number PCT/JP2017/035150, filed on Sep. 28, 2017. Further, this application claims the benefit of priority from the Japanese Patent Application Number 2016-216090, filed on Nov. 4, 2016, Japanese Patent Application Number 2017-014369, filed on Jan. 30, 2017, and Japanese Patent Application Number 2017-029330, filed on Feb. 20, 2017, the entire contents of which are incorporated herein by reference.

TECHNICAL FIELD

The present invention relates to a vehicle seat having an airbag provided in a side portion.

BACKGROUND ART

A vehicle seat equipped with a side airbag device which expands and deploys an airbag provided in a side portion of a vehicle seat in the event of side collision and protects an occupant is known (for example, see Patent Literature 1 below).

CITATION LIST

Patent Literature

PATENT LITERATURE 1: JP 5669567 B2

SUMMARY OF INVENTION

Technical Problem

In the above-described related art, an airbag module is attached to a bracket which extends from a side frame toward a seat front side. For that reason, the workability when attaching the airbag module from a seat back side to the seat frame was low.

The present invention has been made in view of the above-described problem and an object of the present invention is to provide a vehicle seat which improves workability when attaching an airbag module disposed in a side portion of a vehicle seat from a seat back side.

Solution to Problem

According to the vehicle seat of the present invention, the above-described problems are solved by including: a side frame which constitutes a side portion of a seat back frame; a bracket which includes an attachment portion attached to a side surface of a side frame on a seat inner side and a back protrusion portion protruding backward from the attachment portion; and an airbag module which is fixed to the back protrusion portion.

According to the above-described vehicle seat, since the bracket for attaching the airbag module is attached to the inner surface of the side frame, it is possible to obtain a compact width of the attachment portion of the airbag module in the right and left direction. Further, since the airbag module is attached to a back side in relation to the attachment portion between the bracket and the side frame, it is possible to improve workability when assembling the airbag module from the seat back side to the bracket.

Further, in the above-described vehicle seat, the side frame may include a cylindrical pipe frame and a plate-shaped plate frame attached to a lower portion of the pipe frame, and the airbag module may be attached to a side surface of the plate frame on a seat outer side.

In this way, it is possible to attach the airbag module to both of the bracket and the side surface of the plate frame on the seat outer side. Accordingly, it is possible to strongly attach the airbag module to a seat cushion frame as compared with a case in which the airbag module is attached to any one of the bracket and the plate frame.

Further, in the above-described vehicle seat, the bracket may be attached to a lower portion in relation to a joint portion between the pipe frame and the plate frame in the pipe frame.

In this way, since the bracket is attached a portion below the joint portion between the pipe frame and the plate frame in the side frame, that is, a portion not overlapping the joint portion, it is possible to prevent improvement of rigidity of the side frame. Accordingly, it is possible to maintain appropriate shock absorption of the side frame even when the bracket is attached.

Further, in the above-described vehicle seat, the back protrusion portion may include a back extension portion which extends backward from the attachment portion and an outer extension portion which extends from the back extension portion toward a seat outer side, and the airbag module may be attached to the outer extension portion.

In this way, it is possible to set the direction of the attachment portion to the pipe frame and the direction of the attachment portion to the airbag module in the bracket to be different from each other. Accordingly, it is possible to improve attachment workability by preventing interference between attachment positions of the bracket and the pipe frame and between attachment positions of the bracket and the airbag module.

Further, in the above-described vehicle seat, the airbag module may include an airbag, an inflator which supplies a gas to the airbag, a casing which covers the inflator and the airbag, and a retainer including a protrusion portion which protrudes from the casing, and the outer extension portion of the bracket and the protrusion portion of the retainer may be fixed.

In this way, it is possible to fix the retainer protruding from the airbag module and the bracket. Accordingly, it is possible to improve workability when attaching the airbag module to the bracket.

Further, in the above-described vehicle seat, the outer extension portion of the bracket and the protrusion portion of the retainer may be fixed by fastening a nut to a bolt penetrating both portions, and the protrusion portion of the retainer may be provided with an opening portion through which the bolt is inserted.

In this way, it is possible to easily fix the retainer of the airbag module and the bracket by using the bolt and the nut. Accordingly, it is possible to easily perform an operation of attaching the airbag module to the bracket.

Further, in the above-described vehicle seat, the protrusion portion of the retainer may include an inner extension portion which is provided on a back side of the side frame to extend toward the inner side of the seat, and the inner extension portion and the outer extension portion may be fixed.

In this way, it is possible to easily fix the retainer of the airbag module and the bracket from the seat back side by using the bolt and the nut. Accordingly, it is possible to easily perform an operation of attaching the airbag module to the bracket.

Further, in the above-described vehicle seat, an end portion of the bolt may face backward and the nut may be a cap nut which covers the end portion of the bolt.

In this way, it is possible to easily perform an operation of fastening the nut to the bolt from the seat back side.

Further, since the end portion of the bolt is covered by the cap nut, it is possible to prevent the seat inner portion from being damaged by the end portion of the bolt.

Further, in the above-described vehicle seat, the opening portion of the retainer may be provided across an end portion on the inner side of the seat.

In this way, it is possible to fit the opening portion provided in the retainer to the bolt from the seat outer side. Accordingly, it is possible to easily perform an operation of attaching the airbag module to the bracket.

Further, the above-described vehicle seat may include a seat back pad which covers the seat back frame and the seat back pad may include a storage portion which is opened in the side portion toward a seat outer side and stores the airbag module.

In this way, it is possible to attach the airbag module by disposing the air bag module in the storage portion of the seat back pad even after the seat back pad is attached to the seat back frame. In this way, since it is possible to attach the airbag module after the seat back pad is attached to the seat back frame, no displacement of the airbag module occurs when attaching the seat back pad. Accordingly, it is possible to improve the arrangement accuracy of the airbag module.

Advantageous Effects of Invention

According to the present invention, it is possible to improve the workability when attaching the airbag module disposed in the side portion of the vehicle seat from the seat back side.

According to an aspect of the present invention, it is possible to strongly attach the airbag module to the seat cushion frame.

According to an aspect of the present invention, it is possible to maintain appropriate shock absorption of the side frame even when the bracket is attached.

According to an aspect of the present invention, it is possible to improve attachment workability by preventing an interference between attachment positions of the bracket and the pipe frame and between attachment positions of the bracket and the airbag module.

According to an aspect of the present invention, it is possible to improve workability when attaching the airbag module to the bracket.

According to an aspect of the present invention, it is possible to easily fix the retainer of the airbag module and the bracket by using a bolt and a nut.

According to an aspect of the present invention, it is possible to easily fix the retainer of the airbag module and the bracket from the seat back side by using a bolt and a nut.

According to an aspect of the present invention, it is possible to prevent the seat inner portion from being damaged by the end portion of the bolt.

According to an aspect of the present invention, it is possible to fit the opening portion provided in the retainer to the bolt from the seat outer side.

According to an aspect of the present invention, it is possible to attach the airbag module by disposing the airbag module in the storage portion of the seat back pad even after the seat back pad is attached to the seat back frame.

DESCRIPTION OF EMBODIMENTS

<<1>>

Hereinafter, a vehicle seat S according to an embodiment of the present invention (hereinafter, the embodiment) will be described with reference to FIGS. 1 to 10. The vehicle seat S according to the embodiment is a vehicle seat which includes an airbag device provided in a side portion.

Additionally, the embodiment to be described below is merely an example for easily understanding the present invention and does not limit the present invention. That is, the shapes, dimensions, arrangements, and the like of the members to be described below can be modified and improved without departing from the spirit of the present invention and the equivalents thereof are, of course, also included in the present invention.

In the description below, the "front to back direction" means the front to back direction when viewed from the seated person of the vehicle seat S and corresponds to a direction matching a vehicle traveling direction.

The "seat width direction" means a horizontal width direction of the vehicle seat S and matches the right and left direction when viewed from the seated person of the vehicle seat S.

Further, the "up to down direction" means the height direction of the vehicle seat S and matches the up to down direction when the vehicle seat S is viewed from the front side.

[Configuration of Vehicle Seat S]

Figure 1:
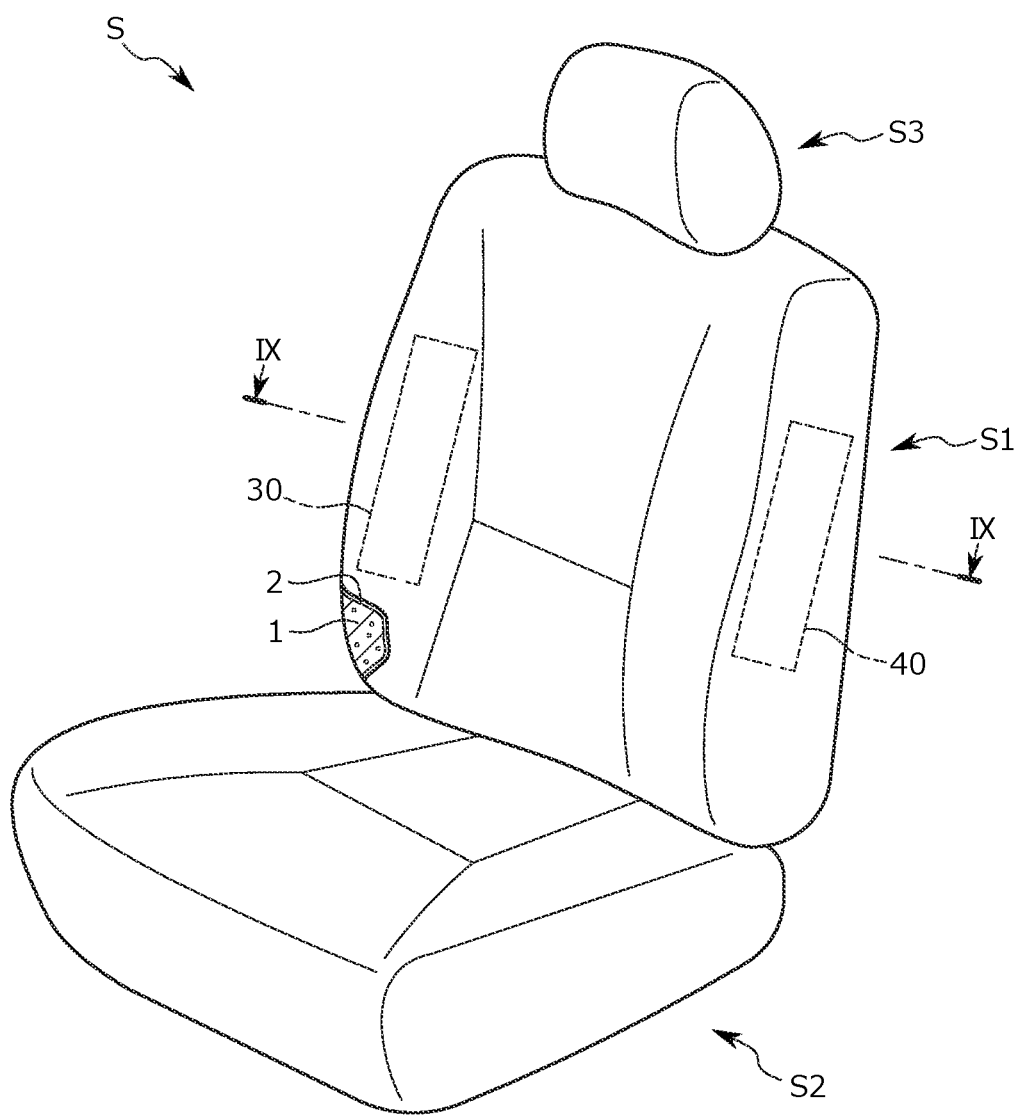
FIG. 1 is a perspective view of a vehicle seat according to the present embodiment.

As illustrated in FIG. 1, the vehicle seat S includes a seat back S1 which becomes a backrest portion, a seat cushion S2 which becomes a seated portion, and a headrest S3 which is disposed at an upper portion of the seat back S1 and supports a head of an occupant.

Figure 2:
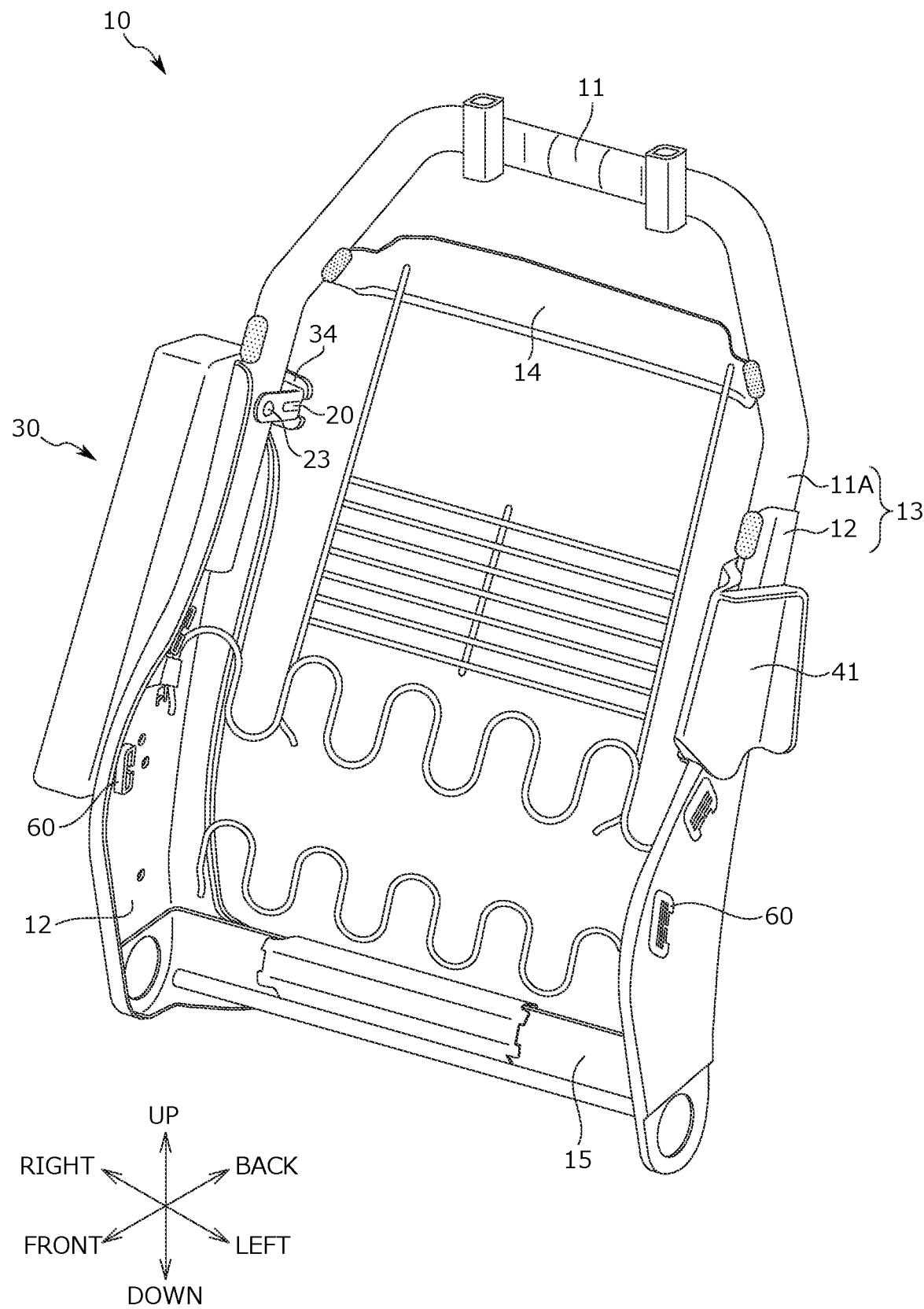
FIG. 2 is a perspective view of a seat back frame.

The seat back S1 has a configuration in which a seat back frame 10 corresponding to a skeleton illustrated in FIG. 2 is covered by a seat back pad 1 and the seat back pad 1 is further covered by a skin 2.

An airbag module 30 and an airbag module 40 are respectively provided inside the side portion of the seat back S1.

In the present embodiment, the airbag module 40 is set to be closer to a door of a vehicle in relation to the airbag module 30. That is, the airbag module 30 is referred to as a far-side airbag device and the airbag module 40 is referred to as a near-side airbag device.

Additionally, the airbag module 30 which is the far-side airbag device is used to protect an occupant of the vehicle seat S from the collision with an occupant seated on a next seat.

Further, the airbag module 40 which is the near-side airbag device is used to protect the occupant of the vehicle seat S from the collision with the door of the vehicle or the outside of the vehicle.

In the present embodiment, an example in which the airbag module 30 corresponding to the far-side airbag device is disposed at the right side of the vehicle seat S and the airbag module 40 corresponding to the near-side airbag device is disposed at the left side thereof is described, but the arrangement of both modules is determined in response to the arrangement of the vehicle seat S in the vehicle and is not limited to the above-described example.

[Configuration of Seat Back S1]

Next, a configuration of the seat back S1 will be described with reference to FIGS. 2 to 9.

FIG. 2 shows a perspective view of the seat back frame 10 which is a skeleton of the seat back S1.

As illustrated in FIG. 2, the seat back frame 10 includes an inverse U-shaped pipe frame 11, a pair of plate frames 12 which respectively forms end portions in the seat width direction, and a lower frame 15 which is bridged between the lower end portions of the pair of plate frames 12.

A side portion 11A of the pipe frame 11 and an upper end portion of the plate frame 12 are respectively disposed to overlap each other in the up to down direction and the side portion 11A of the pipe frame 11 and the upper end portion of the plate frame 12 are joined at a welded portion including a welded portion 50A and a welded portion 50B.

Additionally, in the present embodiment, the side portion of the seat back frame 10 which includes the side portion 11A of the pipe frame 11 and the plate frame 12 is referred to as a side frame 13.

The seat back frame 10 is provided with a cross member 14 which bridges the upper portion of the pipe frame 11 (that is, the upper portion of the side portion 11A).

The airbag module 30 is attached to the right side frame 13 through a bracket 20. Additionally, since the bracket 20 is provided at a lower portion in relation to the welded portion 50A and the welded portion 50B corresponding to the joint portion between the pipe frame 11 and the plate frame 12, it prevents rigidity of the joint portion from being increased more than necessary. Accordingly, the shock absorption of the seat back frame 10 is not disturbed by the attachment of the bracket 20 and the airbag module 30.

[Attachment Structure of Airbag Module 30]

Hereinafter, an attachment structure of the airbag module 30 with respect to the bracket 20 will be described in detail with reference to FIG. 3 and FIGS. 5 to 9.

Figure 5:
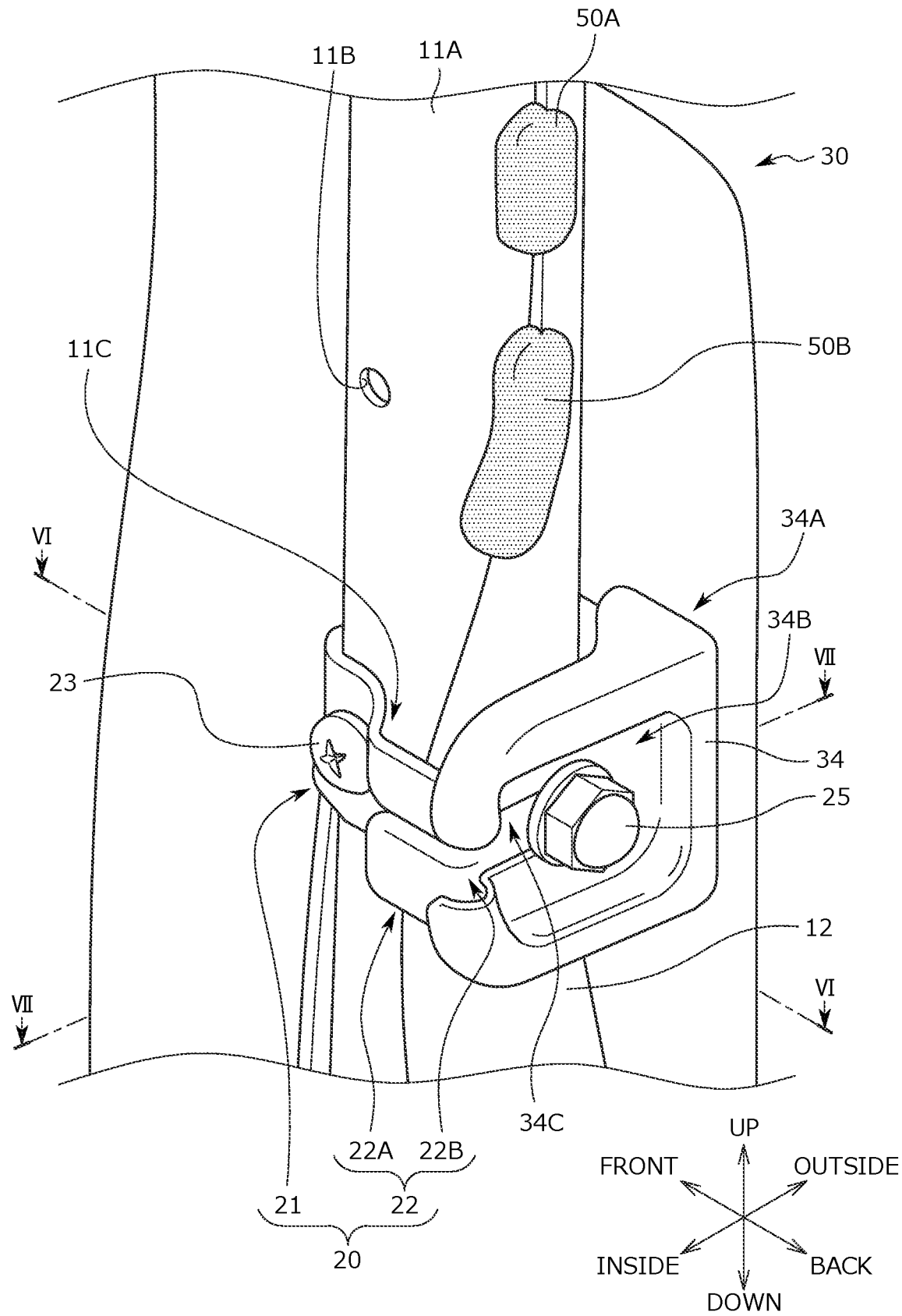
FIG. 5 is an enlarged view of a position in which an airbag module is attached to a pipe frame.
Figure 6:
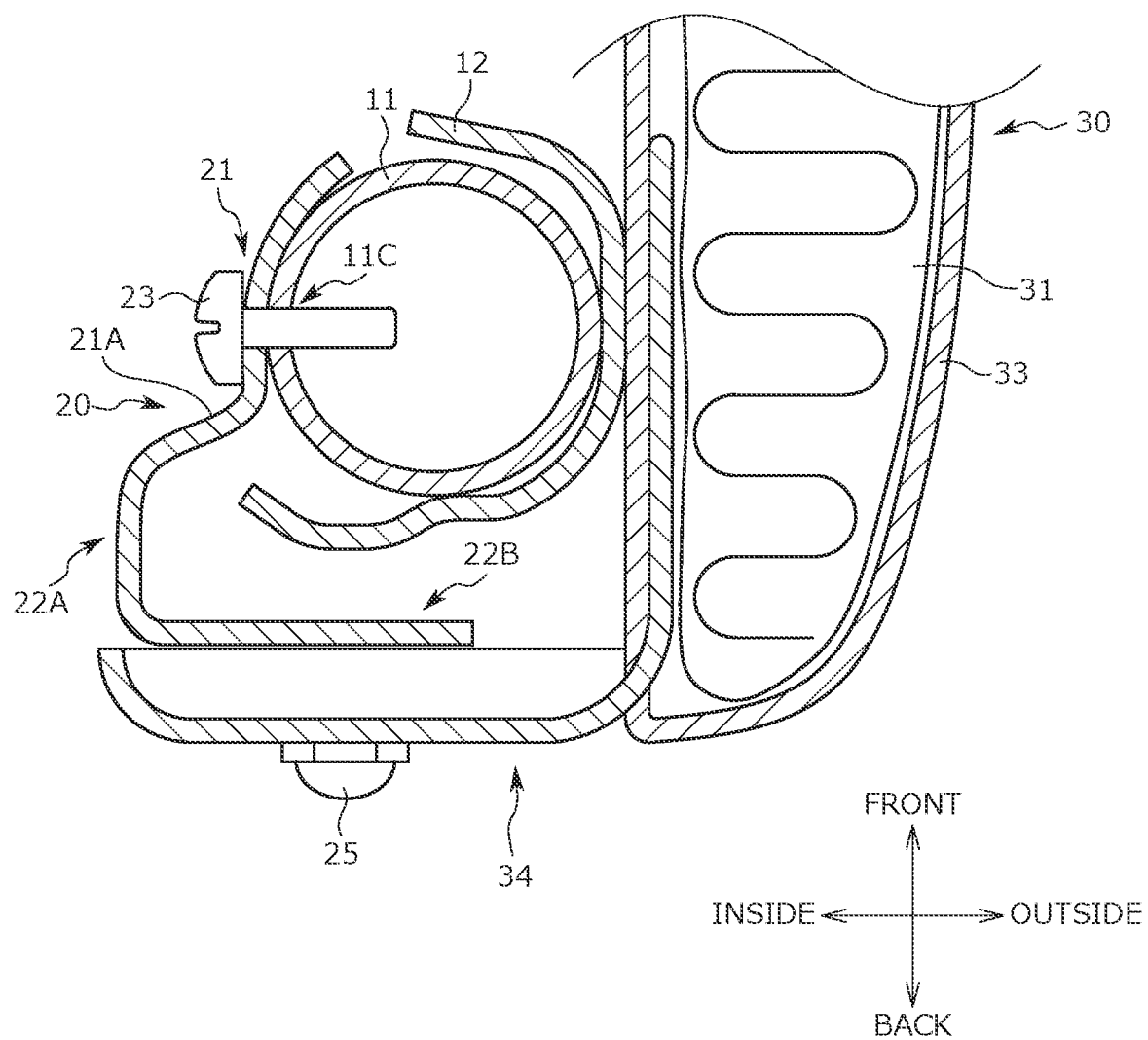
FIG. 6 is a cross-sectional view taken along a line VI-VI of FIG. 5.

As illustrated in FIGS. 5 and 6, a side surface of the side portion 11A of the right pipe frame 11 on the seat inner side is provided with a through-hole 11B and a through-hole 11C which are formed at the upper and lower sides.

Here, the bracket 20 includes an attachment portion 21 which is attached to the through-hole 11C of the pipe frame 11 and a back protrusion portion 22 which protrudes from the attachment portion 21 backward. Additionally, the back protrusion portion 22 includes a back extension portion 22A which extends from the attachment portion 21 toward the seat back side and an outer extension portion 22B which extends from the back extension portion 22A toward the seat outer side.

A screw 23 is fastened to the through-hole formed in the attachment portion 21 of the bracket 20 and the through-hole 11C formed in the bracket 20 so that the bracket 20 is fixed to the pipe frame 11.

Figure 3:
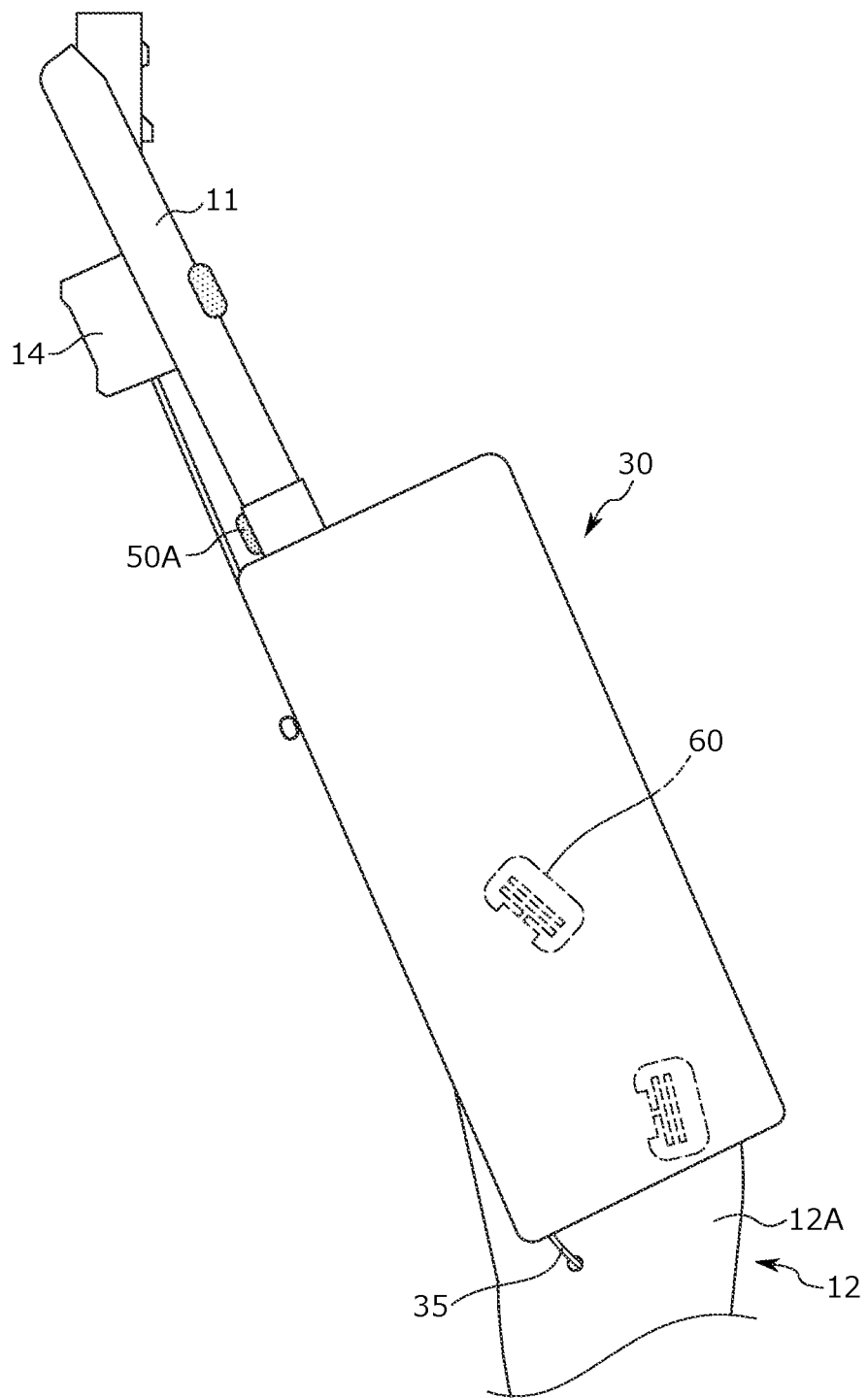
FIG. 3 is a right view of the seat back frame.
Figure 7:
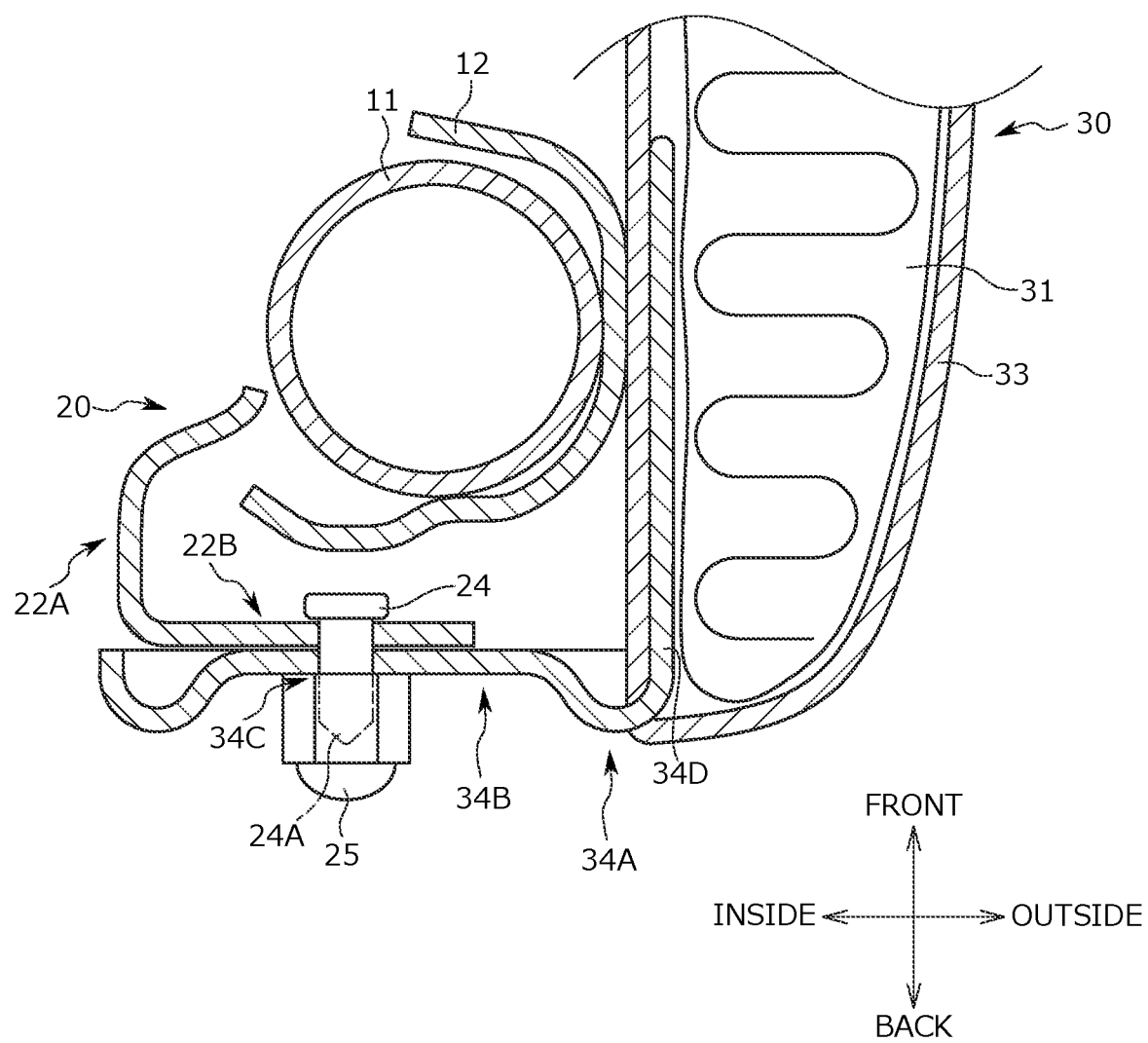
FIG. 7 is a cross-sectional view taken along a line VII-VII of FIG. 5.

As illustrated in FIGS. 3, 5, and 7, the airbag module 30 includes an airbag 31, an inflator 32, and a retainer 34 provided inside a casing 33.

The inflator 32 generates a gas when receiving an input of an operation signal via a harness 35 from a sensor detecting collision of the vehicle. Then, the inflator 32 expands and deploys the airbag 31 by injecting a generated gas into the airbag 31.

The retainer 34 is a plate member for attaching the airbag module 30 to the seat back frame 10. The retainer 34 includes a flat plate portion 34D which faces an outer surface 12A of the plate frame 12 and a protrusion portion 34A which protrudes from the casing 33.

Figure 8:
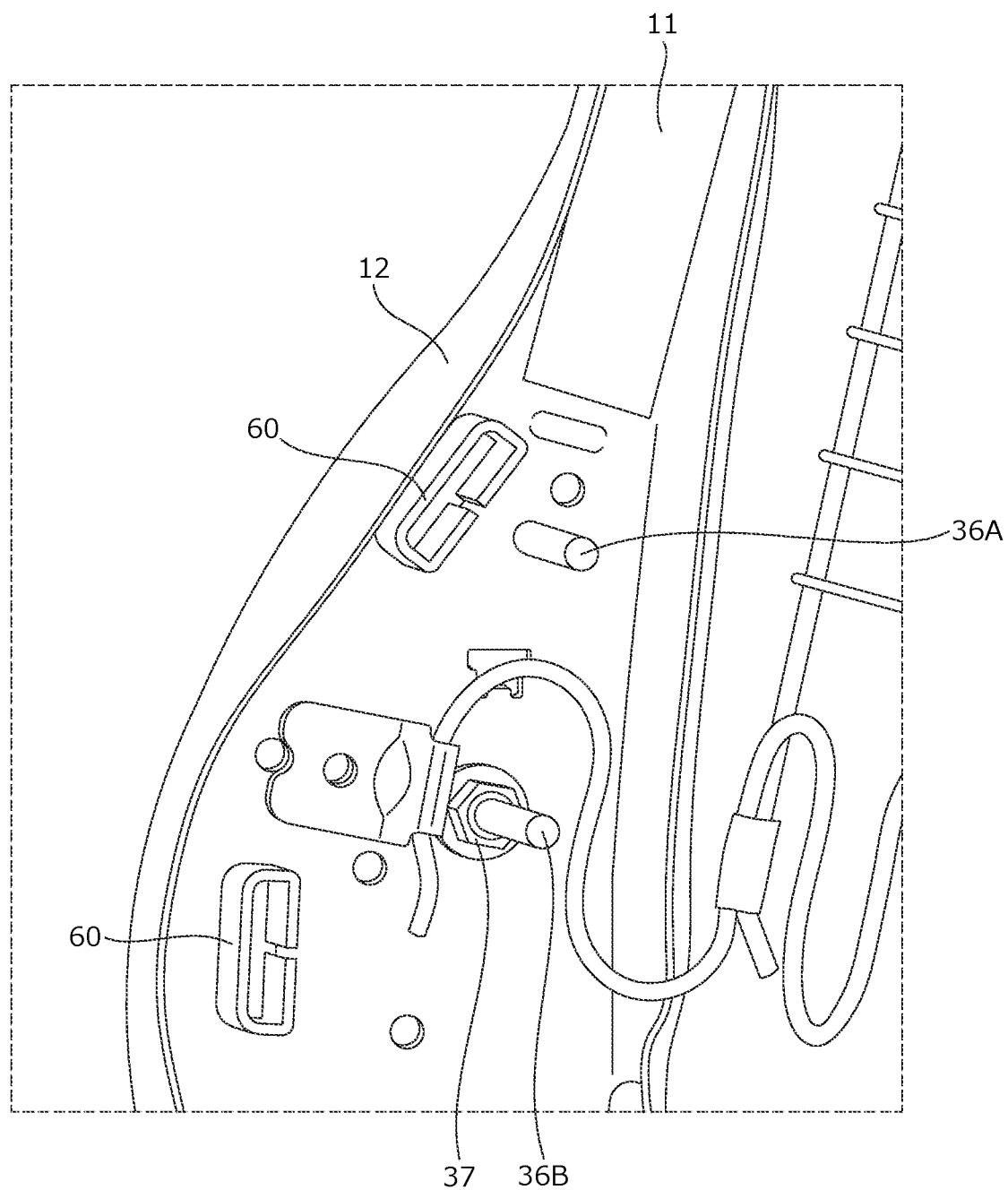
FIG. 8 is an enlarged view of a portion in which an airbag module is attached to a plate frame.

As illustrated in FIG. 8, a stud bolt 36A and a stud bolt 36B which are provided in the inflator 32 protrude toward the seat inner side through the flat plate portion 34D of the retainer 34. Each of the stud bolt 36A and the stud bolt 36B passes through the through-hole formed in the plate frame 12.

Then, the inflator 32, the retainer 34, and the plate frame 12 are fixed by fastening a nut to the stud bolt 36A from the seat inner side of the plate frame 12.

Meanwhile, the inflator 32 and the retainer 34 are fixed by fastening a nut 37 to the stud bolt 36B. Additionally, the through-hole of the plate frame 12 through which the stud bolt 36B passes has a diameter larger than that of the nut 37 and the retainer 34 and the plate frame 12 are not fixed at this portion.

Further, a webbing clip 60 for fixing a webbing is attached to the plate frame 12 at a position interposing the stud bolt 36A and the stud bolt 36B in the vertical direction. Here, the webbing is a member that guides the deploying direction of the airbag 31 by covering the side portion of the airbag module 30.

As illustrated in FIG. 5, the outer extension portion 22B of the bracket 20 is attached to the protrusion portion 34A of the retainer 34.

Specifically, as illustrated in FIGS. 5 and 7, the protrusion portion 34A includes an inner extension portion 34B which extends toward the seat inner side and an opening portion 34C is formed from the center of the inner extension portion 34B to the end portion on the seat inner side.

Then, a bolt 24 passes through the through-hole formed in the outer extension portion 22B of the bracket 20 and the opening portion 34C and a cap nut 25 is fitted to an end portion 24A of the bolt 24 to be fastened thereto. Accordingly, the bracket 20 and the retainer 34 are fixed.

Additionally, according to the above-described configuration, the end portion 24A of the bolt 24 faces the seat back side and the cap nut 25 can be fitted thereto from the seat back side. Further, since the end portion 24A of the bolt 24 is covered by the cap nut 25, it is possible to prevent the end portion 24A of the bolt 24 from damaging the inside of the seat back S1.

Figure 9:
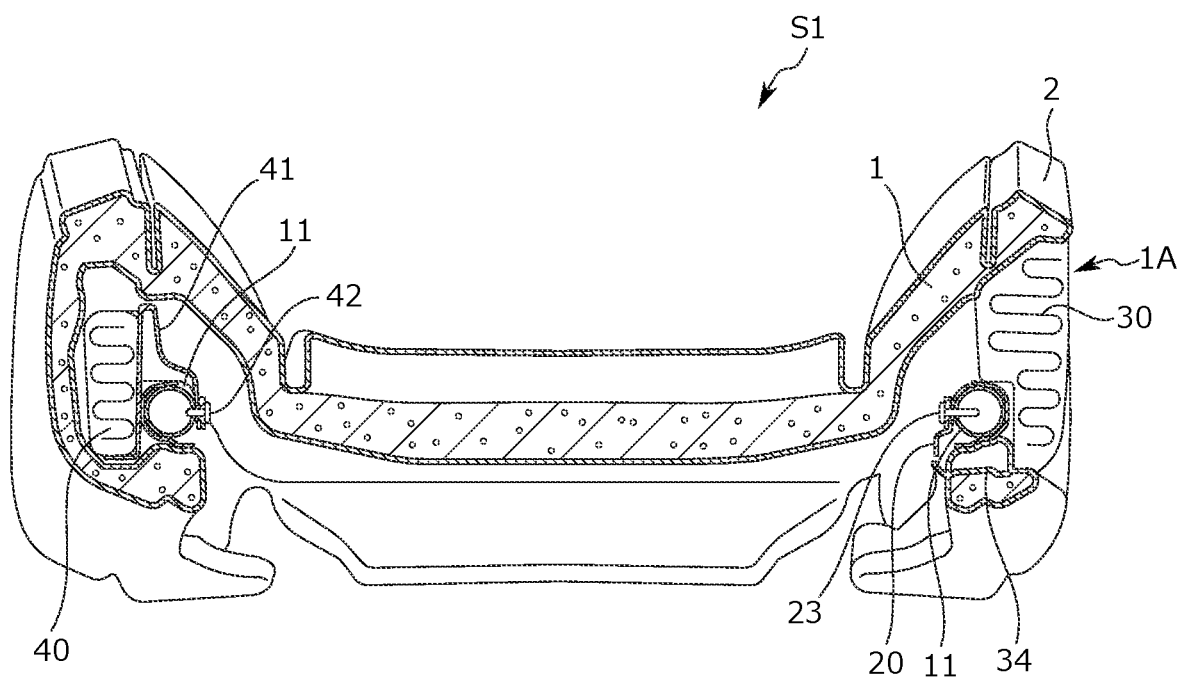
FIG. 9 is a cross-sectional view taken along a line IX-IX of FIG. 1.

As illustrated in FIG. 9, a side portion on the arrangement side of the airbag module 30 in the seat back pad 1 of the seat back S1 is provided with a storage portion 1A in which a pad member is hollowed out. The airbag module 30 is disposed in the storage portion 1A.

In this way, since the storage portion 1A for disposing the airbag module 30 therein is provided in the seat back pad 1, it is possible to attach the airbag module 30 to the seat back frame 10 after the seat back pad 1 is assembled to the seat back frame 10 in the seat back S1. For this reason, it is possible to prevent the displacement of the airbag module 30 as compared with a case in which the seat back pad 1 is covered by the seat back frame 10 after the airbag module 30 is attached to the seat back frame 10.

Next, an attachment structure of the airbag module 40 with respect to the seat back frame 10 will be described. Additionally, the airbag module 40 faces an outer surface of a side plate 41 attached to the left side frame 13 of the seat back frame 10 to be attached.

As illustrated in FIG. 9, the side plate 41 is fixed to the pipe frame 11 by threading a screw 42 into the through-hole of the pipe frame 11 on the seat inner side and the through-hole provided in the side plate 41.

Figure 4:
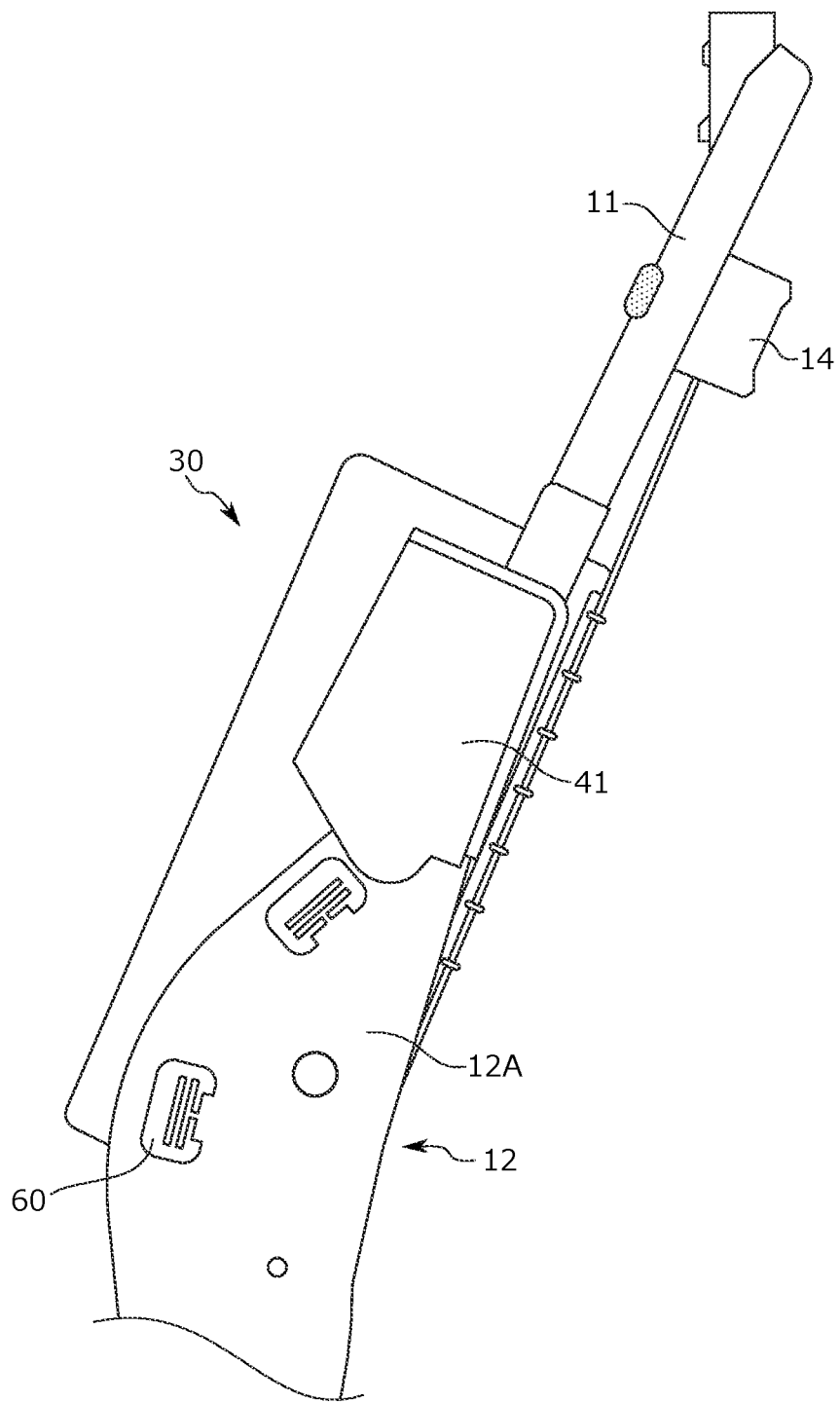
FIG. 4 is a left view of the seat back frame.

Further, as illustrated in FIG. 4, the position of the upper end of the airbag module 30 is higher than the upper end of the side plate 41 to which the airbag module 40 is attached. That is, the upper end of the airbag module 30 is located at a position higher than the upper end of the airbag module 40.

According to the above-described vehicle seat S, since the bracket 20 for attaching the airbag module 30 is attached to the inner surface of the side frame 13, it is possible to obtain a compact width of the attachment portion of the airbag module 30 in the right and left direction. Further, since the airbag module 30 is attached to the seat back side in relation to the attachment portion between the bracket 20 and the side frame 13, it is possible to improve workability when assembling the airbag module 30 to the bracket 20 from the seat back side.

Further, according to the vehicle seat S, it is possible to attach the airbag module 30 to both of the bracket 20 and the outer surface 12A of the plate frame 12. Accordingly, it is possible to strongly attach the airbag module 30 as compared with a case in which the airbag module 30 is attached to any one of the bracket 20 and the plate frame 12.

Further, according to the vehicle seat S, since the bracket 20 is attached to a position below the joint portion (the welded portion 50A and the welded portion 50B) between the pipe frame 11 and the plate frame 12 in the side frame 13, that is, a position not overlapping the joint portion, it is possible to prevent improvement of rigidity of the side frame 13. Accordingly, it is possible to maintain appropriate shock absorption of the side frame 13 even when the bracket 20 is attached.

Further, according to the vehicle seat S, it is possible to set the direction of the attachment portion to the pipe frame 11 and the direction of the attachment portion to the airbag module 30 in the bracket 20 to be different from each other. Accordingly, it is possible to improve attachment workability by preventing interference between attachment positions of the bracket 20 and the pipe frame 11 and between attachment positions of the bracket 20 and the airbag module 30.

Further, according to the vehicle seat S, it is easy to attach the bracket 20 and the retainer 34 of the airbag module 30 from the seat back side by using the bolt 24 and the cap nut 25.

Further, since the end portion 24A of the bolt 24 is covered by the cap nut 25, it is possible to prevent the seat back pad 1 from being damaged by the end portion 24A of the bolt 24.

Further, according to the vehicle seat S, it is possible to fit the opening portion 34C of the retainer 34 to the bolt 24 from the seat outer side. Accordingly, it is possible to improve attachment workability of the airbag module 30.

Further, according to the vehicle seat S, since the storage portion 1A which stores the airbag module 30 is provided in the side portion of the seat back pad 1, the airbag module 30 can be disposed and attached in the storage portion 1A of the seat back pad 1 even after the seat back pad is attached to the seat back frame 10. In this way, since it is possible to attach the airbag module 30 after the seat back pad 1 is attached to the seat back frame 10, it is possible to prevent the displacement of the airbag module 30 when attaching the seat back pad 1. Accordingly, it is possible to improve the arrangement accuracy of the airbag module 30.

Other Embodiments

Further, the present invention is not limited to the above-described embodiment.

Figure 10:
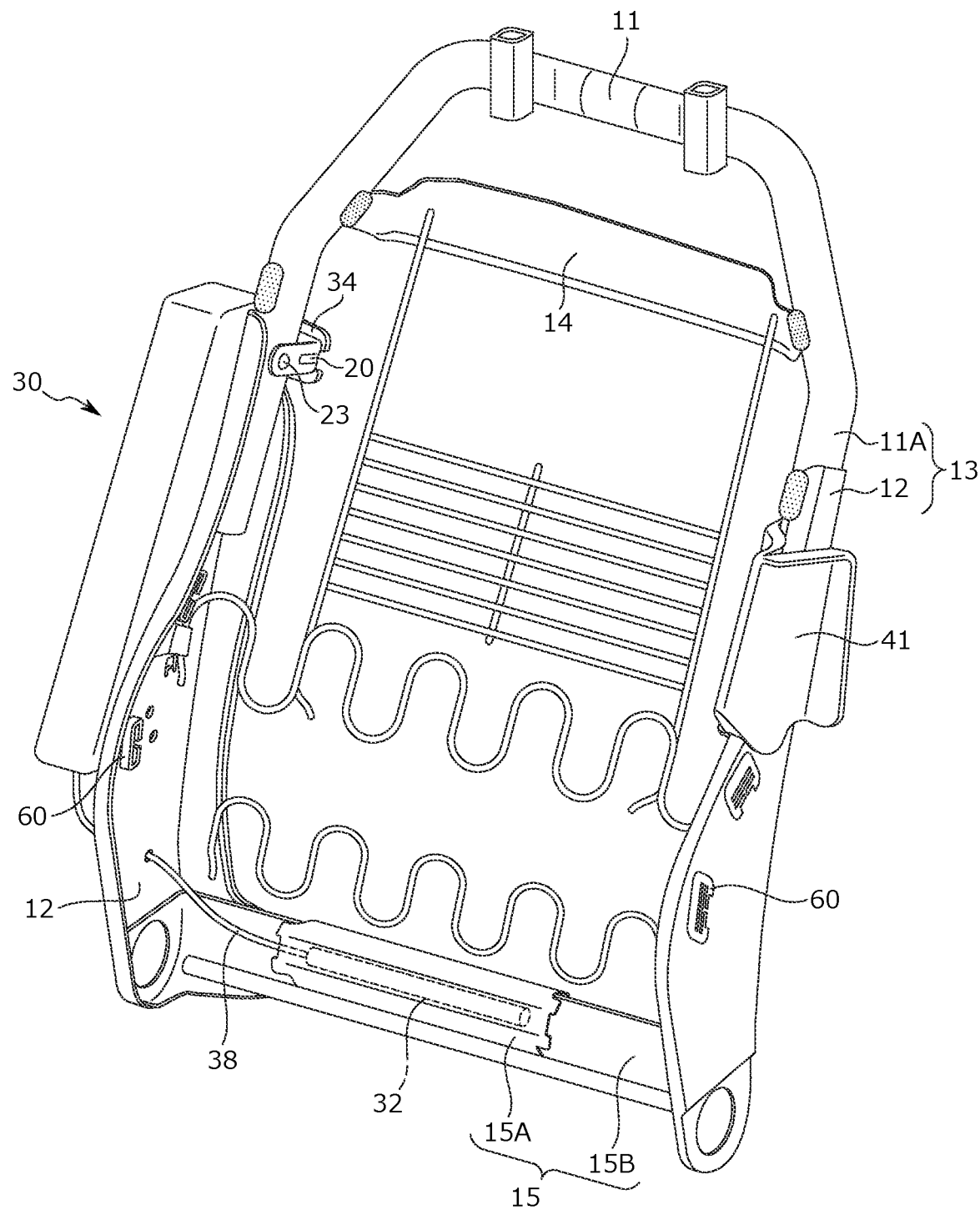
FIG. 10 is a perspective view illustrating a modified example in which the arrangement of an inflator in a seat back frame is changed.

For example, as illustrated in FIG. 10, the inflator 32 may be disposed at the outside of the casing 33 of the airbag module 30. At this time, the inflator 32 is disposed between a front wall portion 15A which is located in the lower frame 15 on the seat front side to support a waist portion of an occupant and a back wall portion 15B which is located on the seat back side.

Additionally, the stud bolt 36A and the stud bolt 36B attached to the inflator 32 pass through the through-holes provided in the back wall portion 15B and are fixed to the back wall portion 15B by nuts.

Further, the inflator 32 and the airbag 31 are connected by a pipe 38 and a gas generated from the inflator 32 is injected to the airbag 31 through the pipe 38.

In this way, since the inflator 32 is disposed at the position of the lower frame 15, it is possible to reduce the weight of the upper portion of the seat back frame 10. Accordingly, it is possible to prevent the deformation of the seat back frame 10 in the event of collision of the vehicle.

Further, since the inflator 32 is disposed between the front wall portion 15A and the back wall portion 15B of the lower frame 15, it is possible to protect the inflator 32 from an external shock.

<<2>>

Next, the retainer 34 will be described in detail.

Figure 11:
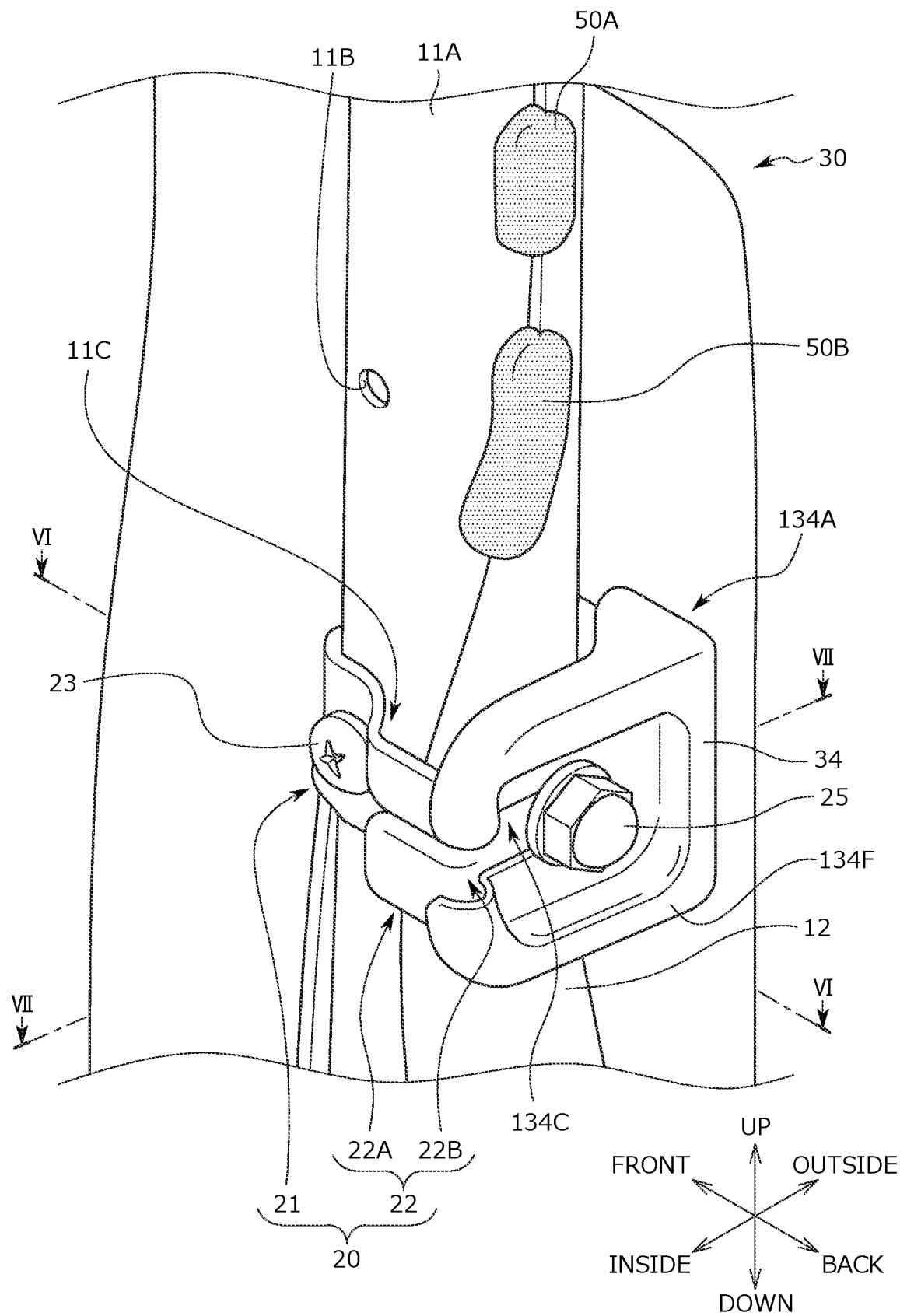
FIG. 11 is a right view of a seat back frame.
Figure 12:
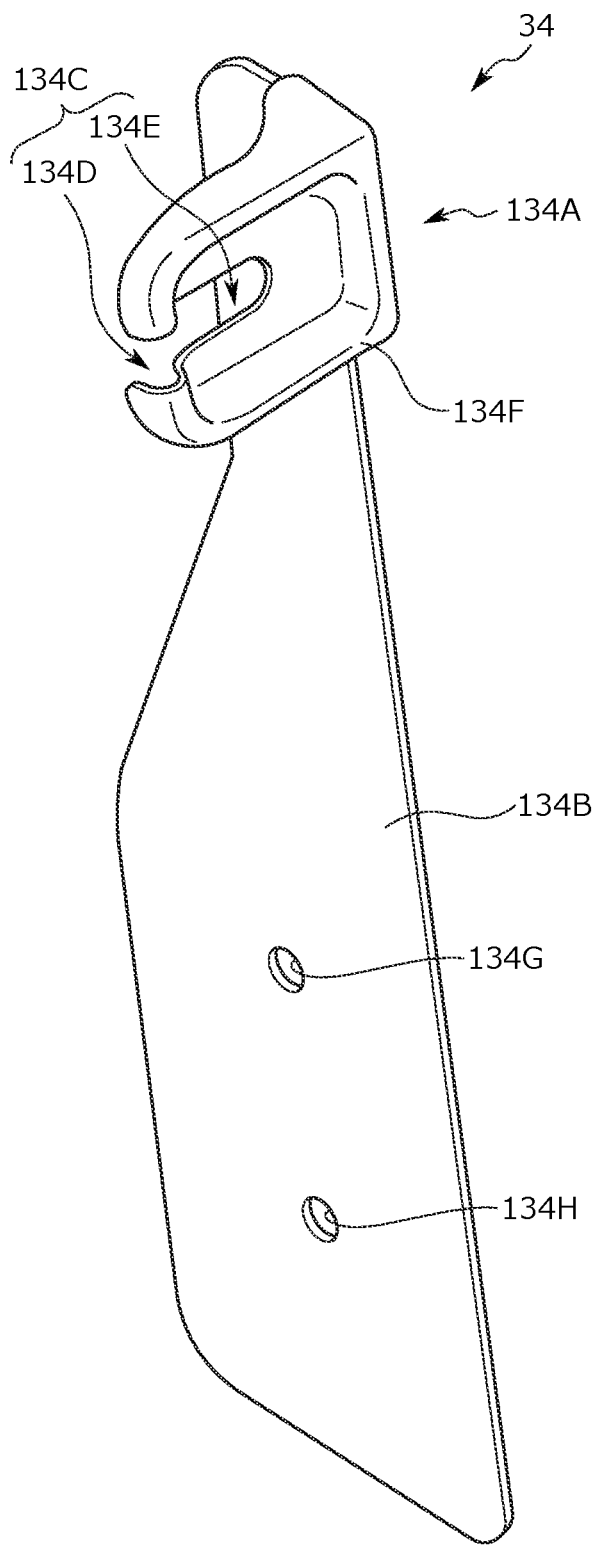
FIG. 12 is a perspective view of a retainer.
Figure 13:
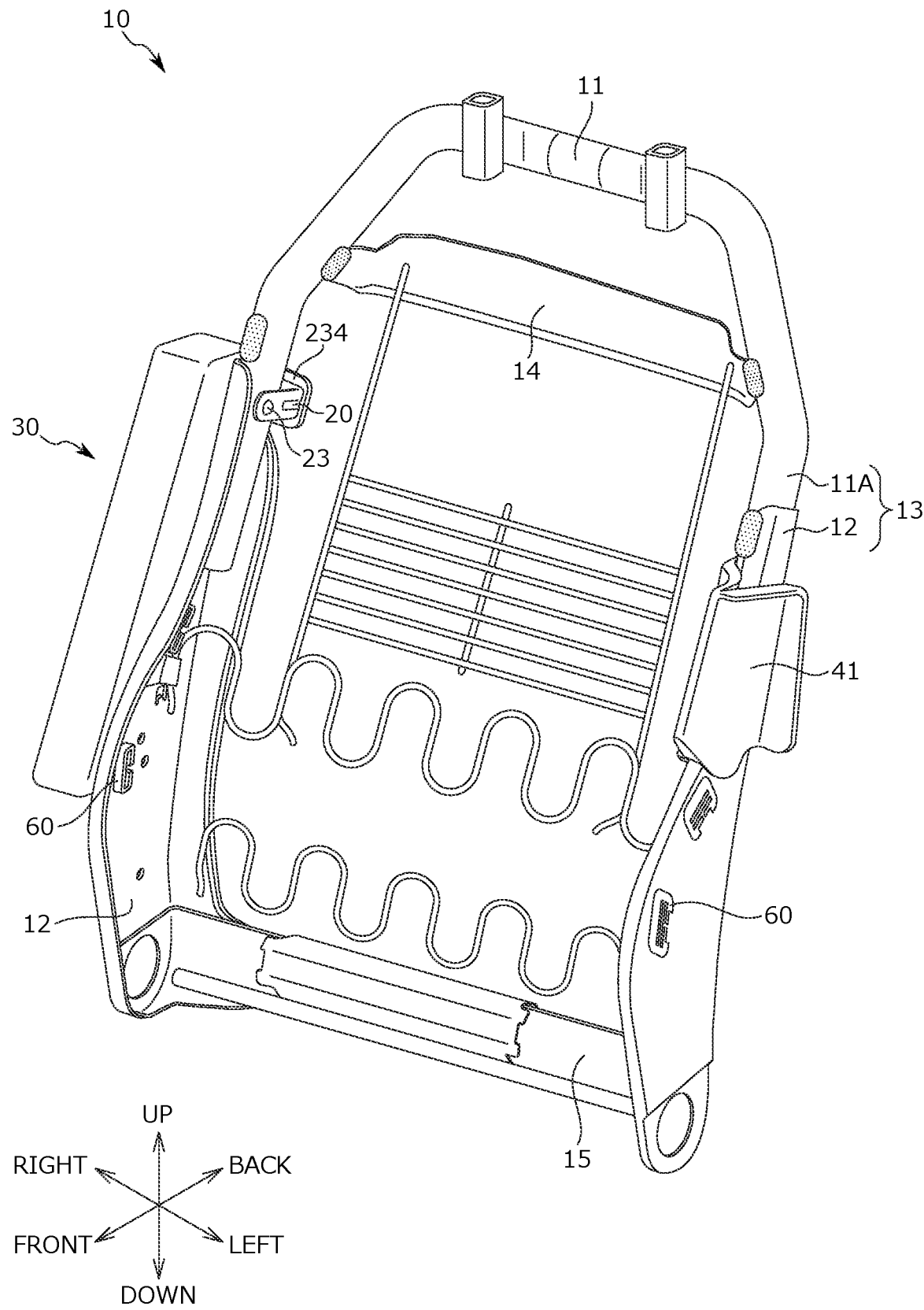
FIG. 13 is a perspective view of the seat back frame.

As illustrated in FIGS. 11, 7, and 12, the retainer 34 includes a first extension portion 134A which protrudes from the casing 33 and extends toward the seat inner side and a second extension portion 134B which faces the outer surface 12A of the plate frame 12.

As illustrated in FIGS. 12 and 9, the stud bolt 36A and the stud bolt 36B which are provided in the inflator 32, passing through a first through-hole 134G and a second through-hole 134H formed in the second extension portion 134B of the retainer 34, protrude toward the seat inner side. Each of the stud bolt 36A and the stud bolt 36B passes through the through-hole formed in the plate frame 12.

Then, the inflator 32, the retainer 34, and the plate frame 12 are fixed by fastening a nut to the stud bolt 36A from the seat inner side of the plate frame 12.

Meanwhile, the inflator 32 and the retainer 34 are fixed by fastening the nut 37 to the stud bolt 36B. Additionally, the through-hole of the plate frame 12 through which the stud bolt 36B passes has a diameter larger than that of the nut 37 and the retainer 34 and the plate frame 12 are not fixed at this portion.

Further, the webbing clip 60 for fixing a webbing is attached to the plate frame 12 at a position interposing the stud bolt 36A and the stud bolt 36B in the vertical direction. Here, the webbing is a member that guides the deploying direction of the airbag 31 by covering the side portion of the airbag module 30.

As illustrated in FIG. 11, the outer extension portion 22B of the bracket 20 is attached to the first extension portion 134A of the retainer 34.

Specifically, as illustrated in FIGS. 11 and 12, the first extension portion 134A is provided with a notch portion 134C which is notched from an end opening portion 134D of the end portion on the seat inner side to a center opening portion 134E at the center portion.

Here, a bead portion 134F which protrudes toward the seat back side is formed in the periphery of the notch portion 134C in the first extension portion 134A. In this way, since the first extension portion 134A is provided with the bead portion 134F, the strength of the first extension portion 134A is improved.

Then, the bolt 24 passes through the through-hole formed in the outer extension portion 22B of the bracket 20 and the notch portion 134C, and the cap nut 25 is fitted to the end portion 24A of the bolt 24 to be fastened thereto. Accordingly, the bracket 20 and the retainer 34 are fixed.

Additionally, according to the above-described configuration, the end portion 24A of the bolt 24 faces the seat back side and the cap nut 25 can be fitted thereto from the seat back side. Further, since the end portion 24A of the bolt 24 is covered by the cap nut 25, it is possible to prevent the inside of the seat back S1 from being damaged by the end portion 24A of the bolt 24.

According to the above-described vehicle seat S, since the bracket 20 for attaching the airbag module 30 is attached to the inner surface of the side frame 13, it is possible to obtain a compact width of the attachment portion of the airbag module 30 in the right and left direction. Further, since the airbag module 30 is attached to the seat back side in relation to the attachment portion between the bracket 20 and the side frame 13, it is possible to improve workability when assembling the airbag module 30 to the bracket 20 from the seat back side.

Further, it is possible to prevent the separation of the retainer 34 and the side frame 13 which are fixed to each other even when a force is applied to the retainer 34 in the inner direction of the seat and the up to down direction of the seat.

Further, in the vehicle seat S, the retainer 34 is fixed to the bracket 20 attached to the side frame 13 by using the bolt 24 and the cap nut 25. In this way, it is possible to easily perform an operation of attaching the retainer 34 to the side frame 13.

Further, according to the vehicle seat S, it is possible to attach the airbag module 30 to both of the bracket 20 and the outer surface 12A of the plate frame 12. Accordingly, it is possible to improve attachment rigidity as compared with a case in which the airbag module 30 is attached to any one of the bracket 20 and the plate frame 12.

Further, according to the vehicle seat S, since the opening width of the end opening portion 134D of the notch portion 134C is narrower than the opening width of the center opening portion 134E through which the bolt 24 is inserted, it is possible to prevent the bolt 24 from being separated from the notch portion 134C of the retainer 34 even when a force is applied to the retainer 34 in the outer direction of the seat after the retainer 34 is attached to the side frame 13. Accordingly, it is possible to prevent the separation of the retainer 34 and the side frame 13 which are fixed to each other.

Further, according to the vehicle seat S, since the bead portion 134F is formed in the periphery of the notch portion 134C in the first extension portion 134A, it is possible to improve rigidity in the periphery of the attachment portion with the side frame 13 in the retainer 34.

Further, according to the vehicle seat S, since the retainer 34 is exposed from a gap between the upper end and the lower end of the casing 33 of the airbag module 30, it is possible to obtain the airbag module 30 in a compact size.

The vehicle seat according to the present invention includes a side frame which constitutes a side portion of a seat back frame and an airbag module which is attached to the side frame, in which the airbag module includes a retainer which is attached to the side frame, the retainer includes a first extension portion provided behind the side frame and extending to a seat inner side, the first extension portion is provided with a notch portion formed from an end portion on the seat inner side toward a seat outer side, and the retainer is fixed to the side frame by using an attachment member inserted through the notch portion.

According to the above-described vehicle seat, it is possible to assemble the airbag module to the side frame of the seat back from the seat back side. Accordingly, it is possible to improve workability when attaching the airbag module disposed at the side portion of the vehicle seat from the seat back side.

Further, it is possible to prevent the separation of the retainer and the side frame which are fixed to each other even when a force is applied to the retainer in the inner direction of the seat and the up to down direction of the seat.

In the above-described vehicle seat, the retainer includes a second extension portion which is connected to the first extension portion and extends to the seat front side and the second extension portion is attached to the side frame.

In this way, it is possible to attach the retainer to the side frame at two surfaces. For this reason, it is possible to improve attachment rigidity of the retainer and the side frame.

In the above-described vehicle seat, the notch portion is fixed to the bracket attached to the side frame and extending toward the seat back side.

In this way, since the bracket attached to the side frame and extending toward the seat back side and the retainer are attached, it is possible to simply fix the retainer and the side frame.

In the above-described vehicle seat, the bracket is fixed to the retainer by a bolt inserted through the notch portion and a nut threaded to the bolt.

In this way, the retainer is fixed to the bracket attached to the side frame by using the bolt and the nut. Accordingly, it is possible to easily perform an operation of attaching the retainer to the side frame.

In the above-described vehicle seat, the nut is a cap nut which covers an end portion of the bolt.

In this way, since the end portion of the bolt is covered by the cap nut, it is possible to prevent the seat inner portion from being damaged by the end portion of the bolt.

In the above-described vehicle seat, the opening width of the end portion on the seat inner side of the notch portion is narrower than the opening width of the portion through which the bolt is inserted.

In this way, it is possible to prevent the bolt from being separated from the notch portion of the retainer even when a force is applied to the retainer in the outer direction of the seat after the retainer is attached to the side frame. Accordingly, it is difficult to separate the retainer and the side frame which are fixed to each other.

In the above-described vehicle seat, a bead is formed in the periphery of the notch portion in the first extension portion.

In this way, it is possible to improve the rigidity in the periphery of the attachment portion with the side frame in the retainer.

In the above-described vehicle seat, the airbag module includes the retainer, the airbag, the inflator supplying a gas to the airbag, and the casing covering the retainer, the airbag, and the inflator and the retainer is exposed from a gap between the upper end and the lower end of the casing.

In this way, it is possible to obtain the airbag module in a compact size.

The above-described vehicle seat includes a seat back pad which is placed on the seat back frame and the seat back pad includes a storage portion which is opened in the side portion toward the seat outer side and stores the airbag module.

In this way, it is possible to attach the airbag module by disposing the airbag module in the storage portion of the seat back pad after the seat back pad is attached to the seat back frame.

<<3>>

Next, another example of an attachment structure of the bracket 20 and a retainer 234 will be described.

The retainer 234 is a plate member for attaching the airbag module 30 to the seat back frame 10.

As illustrated in FIGS. 13, 14, 16, and 17, the retainer 234 includes an inner extension portion 234A which protrudes from the casing 33 and extends toward the seat inner side and a front extension portion 234B which faces the outer surface 12A of the plate frame 12.

Here, a through-hole is formed at the center portion of the inner extension portion 234A and the bolt 24 (an example of the attachment portion) inserted through the through-hole is attached so that the end portion of the bolt faces the seat back side (that is, the opposite side of the extension direction of the front extension portion 234B). For example, when the inner extension portion 234A is formed of metal, the bolt 24 may be attached to the inner extension portion 234A by welding.

Figure 17:
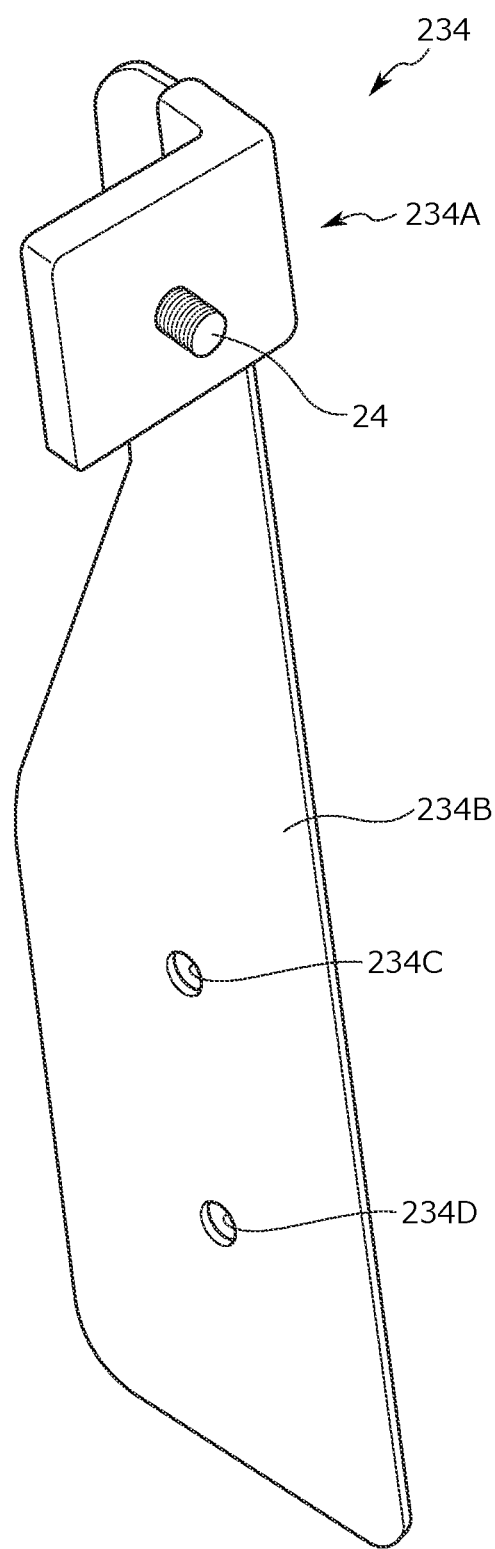
FIG. 17 is a perspective view of the retainer.

As illustrated in FIGS. 17 and 9, the stud bolt 36A and the stud bolt 36B provided in the inflator 32 protrude toward the seat inner side through the first through-hole 234C and the second through-hole 234D formed in the front extension portion 234B of the retainer 234. Each of the stud bolt 36A and the stud bolt 36B passes through the through-hole formed in the plate frame 12.

Then, a nut is fastened to the stud bolt 36A from the seat inner side of the plate frame 12 so that the inflator 32, the retainer 234, and the plate frame 12 are fixed.

Meanwhile, the nut 37 is fastened to the stud bolt 36B so that the inflator 32 and the retainer 234 are fixed. Additionally, the through-hole of the plate frame 12 through which the stud bolt 36B passes has a diameter larger than that of the nut 37 and the retainer 234 and the plate frame 12 are not fixed at this portion.

Further, the webbing clip 60 for fixing a webbing is attached to the plate frame 12 at a position interposing the stud bolt 36A and the stud bolt 36B in the vertical direction. Here, the webbing is a member that guides the deploying direction of the airbag 31 by covering the side portion of the airbag module 30.

Figure 14:
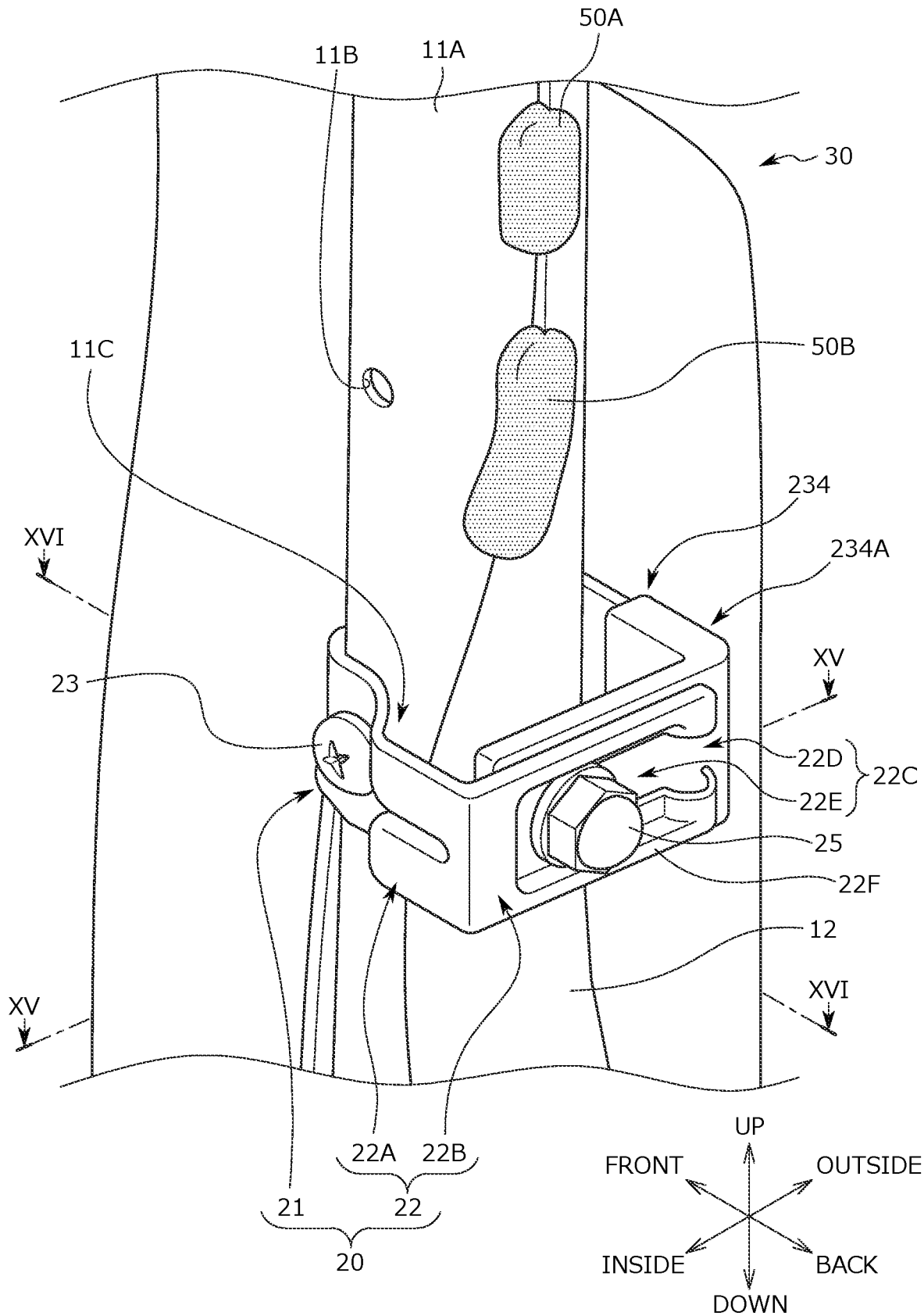
FIG. 14 is an enlarged view of a position in which an airbag module is attached to a pipe frame.
Figure 15:
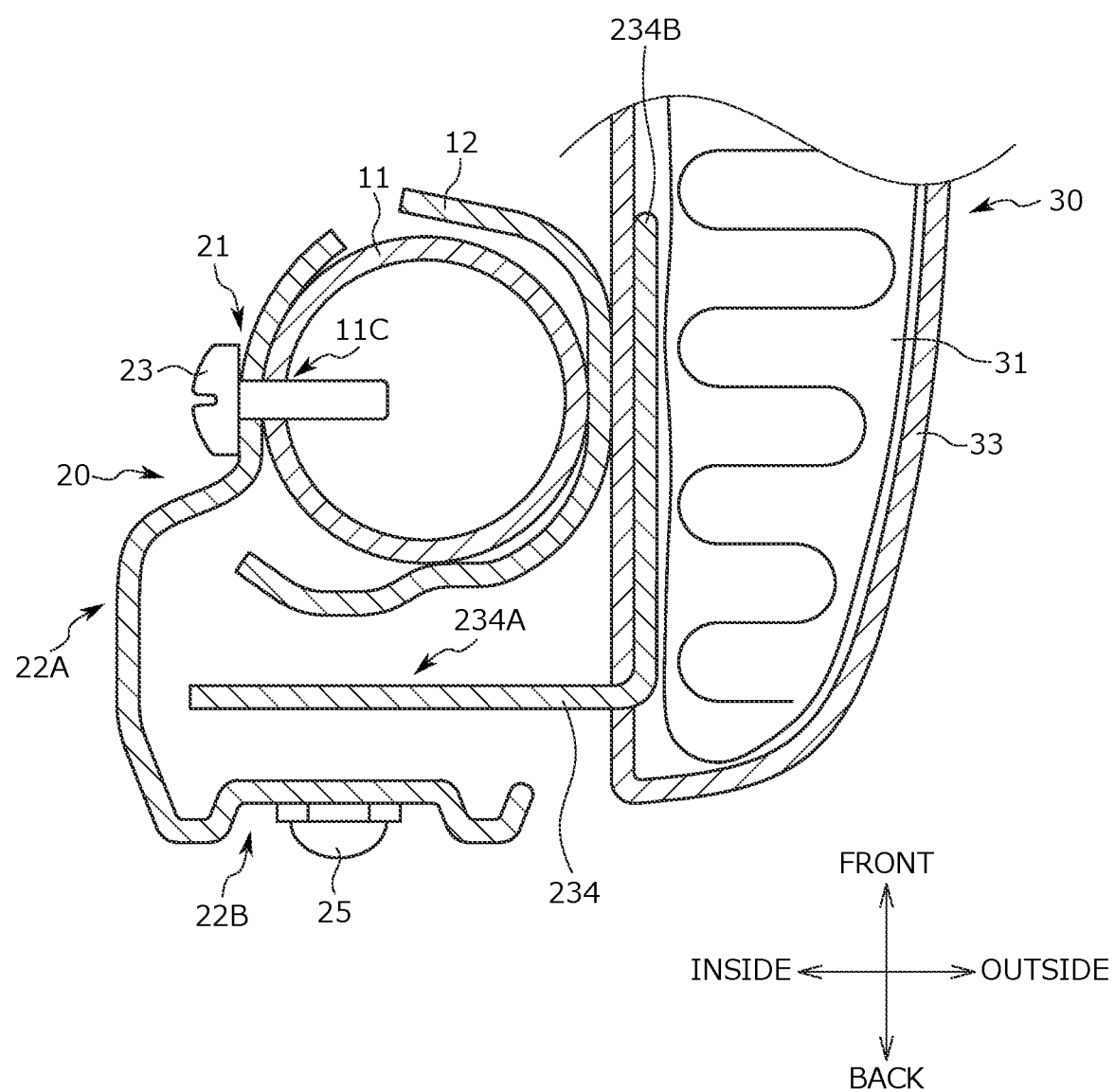
FIG. 15 is a cross-sectional view taken along a line XV-XV of FIG. 14.
Figure 16:
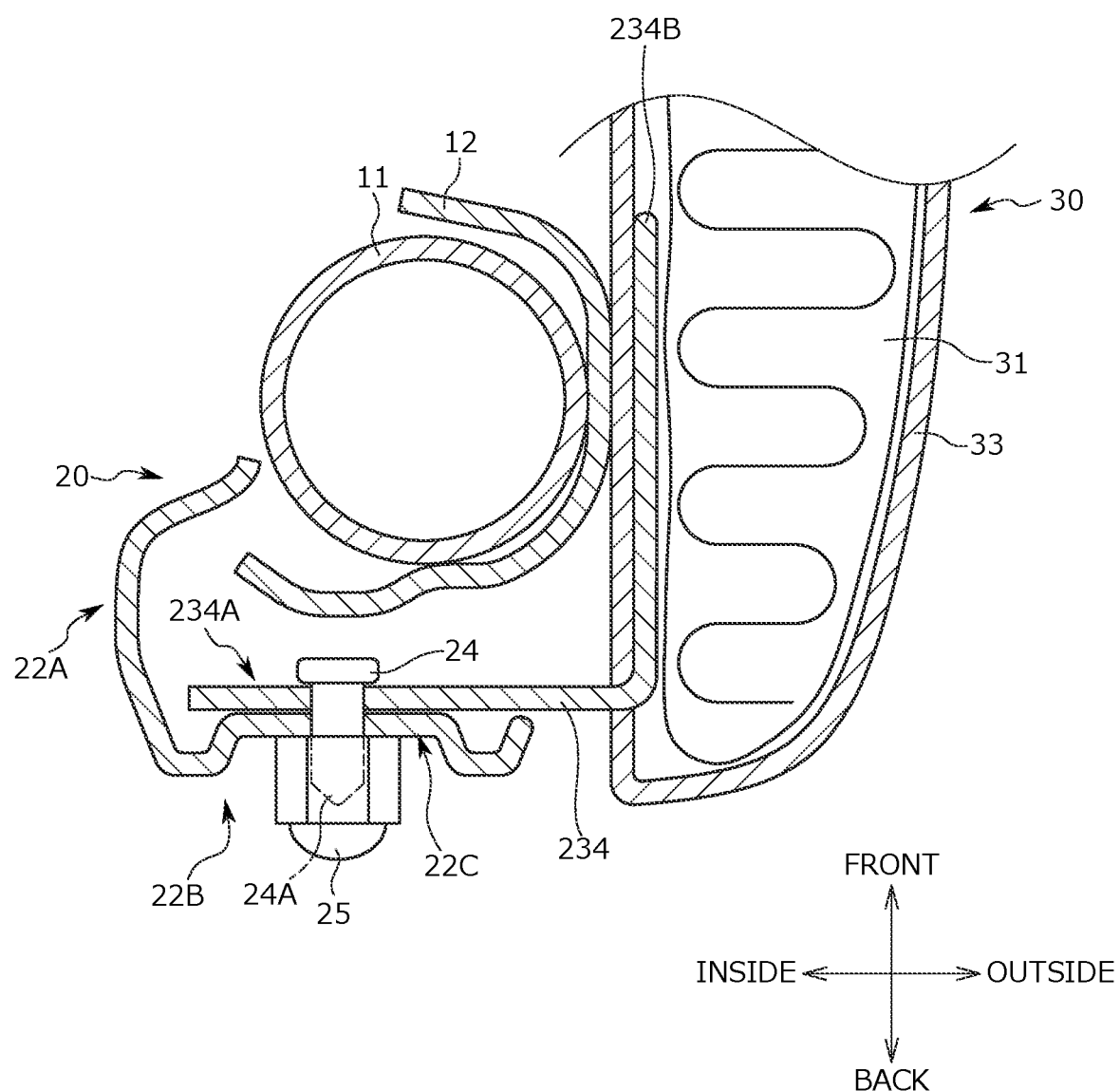
FIG. 16 is a cross-sectional view taken along a line XVI-XVI of FIG. 14.

As illustrated in FIGS. 14 and 15, a side surface of the side portion 11A of the right pipe frame 11 on the seat inner side is provided with the through-hole 11B and the through-hole 11C which are formed at the upper and lower sides.

Here, the bracket 20 includes the attachment portion 21 which is attached to the through-hole 11C of the pipe frame 11 and the back protrusion portion 22 which protrudes from the attachment portion 21 backward. Additionally, the back protrusion portion 22 includes the back extension portion 22A which extends from the attachment portion 21 toward the seat back side and the outer extension portion 22B which extends from the back extension portion 22A toward the seat outer side.

As illustrated in FIG. 14, a screw 23 is fastened to the through-hole formed in the attachment portion 21 of the bracket 20 and the through-hole 11C formed in the bracket 20 so that the bracket 20 is fixed to the pipe frame 11.

As illustrated in FIG. 14, a bead portion which is recessed toward the seat outer side is formed at the center portion of the back extension portion 22A. Accordingly, it is possible to improve the strength of the back extension portion 22A.

As illustrated in FIG. 14, the inner extension portion 234A of the retainer 234 is attached to the outer extension portion 22B.

Specifically, as illustrated in FIGS. 14 and 17, the outer extension portion 22B is provided with a notch portion 22C which is notched from an end opening portion 22D of the end portion on the seat outer side to a center opening portion 22E of the center portion.

Here, a bead portion 22F which protrudes toward the seat back side is formed in the periphery of the notch portion 22C in the outer extension portion 22B. In this way, since the outer extension portion 22B is provided with the bead portion 22F, the strength of the outer extension portion 22B is improved.

Then, the bolt 24 fixed to the retainer 234 passes through the notch portion 22C formed in the outer extension portion 22B of the bracket 20 from the end opening portion 22D toward the center opening portion 22E. Then, the cap nut 25 is fitted and fastened to the end portion 24A of the bolt 24. Accordingly, the bracket 20 and the retainer 234 are fixed.

Additionally, according to the above-described configuration, the end portion 24A of the bolt 24 faces the seat back side and the cap nut 25 can be fitted thereto from the seat back side. Further, since the end portion 24A of the bolt 24 is covered by the cap nut 25, it is possible to prevent the inside of the seat back S1 from being damaged by the end portion 24A of the bolt 24.

According to the above-described vehicle seat S, since the bracket 20 for attaching the airbag module 30 is attached to the inner surface of the side frame 13, it is possible to obtain a compact width of the attachment portion of the airbag module 30 in the right and left direction. Further, since the airbag module 30 is attached to the seat back side in relation to the attachment portion of the bracket 20 and the side frame 13, it is possible to improve workability when assembling the airbag module 30 to the bracket 20 from the seat back side.

Further, it is possible to prevent the separation of the retainer 234 and the side frame 13 which are fixed to each other even when a force is applied to the retainer 234 in the inner direction of the seat and the up to down direction of the seat.

Further, in the vehicle seat S, the retainer 234 is fixed to the bracket 20 attached to the side frame 13 by using the bolt 24 and the cap nut 25. In this way, it is possible to easily perform an operation of attaching the retainer 234 to the side frame 13.

Further, according to the vehicle seat S, it is possible to attach the airbag module 30 to both of the bracket 20 and the outer surface 12A of the plate frame 12. Accordingly, it is possible to improve attachment rigidity as compared with a case in which the airbag module 30 is attached to any one of the bracket 20 and the plate frame 12.

Further, according to the vehicle seat S, since the opening width of the end opening portion 22D in the notch portion 22C of the bracket 20 is narrower than the opening width of the center opening portion 22E through which the bolt 24 is inserted, it is possible to prevent the bolt 24 from being separated from the notch portion 22C of the bracket 20 even when a force is applied to the retainer 234 in the outer direction of the seat after the retainer 234 is attached to the side frame 13. Accordingly, it is possible to prevent the separation of the retainer 234 and the side frame 13 which are fixed to each other.

Further, according to the vehicle seat S, since the bead portion 22F is formed in the periphery of the notch portion 22C in the outer extension portion 22B, it is possible to improve the rigidity in the periphery of the attachment portion with the retainer 234 in the bracket 20.

Further, according to the vehicle seat S, the retainer 234 is exposed from a gap between the upper end and the lower end of the casing 33 of the airbag module 30, it is possible to obtain the airbag module 30 in a compact size.

Further, according to the vehicle seat S, it is possible to fit the bolt 24 attached to the retainer 234 from the outside of the notch portion 22C of the bracket 20. Accordingly, it is possible to improve the attachment workability of the airbag module 30.

Next, the vehicle seat S according to a modified example of the present invention will be described with reference to FIG. 18. In the modified example illustrated in FIG. 18, a bracket 120 has a shape different from that of the bracket 20.

Figure 18:
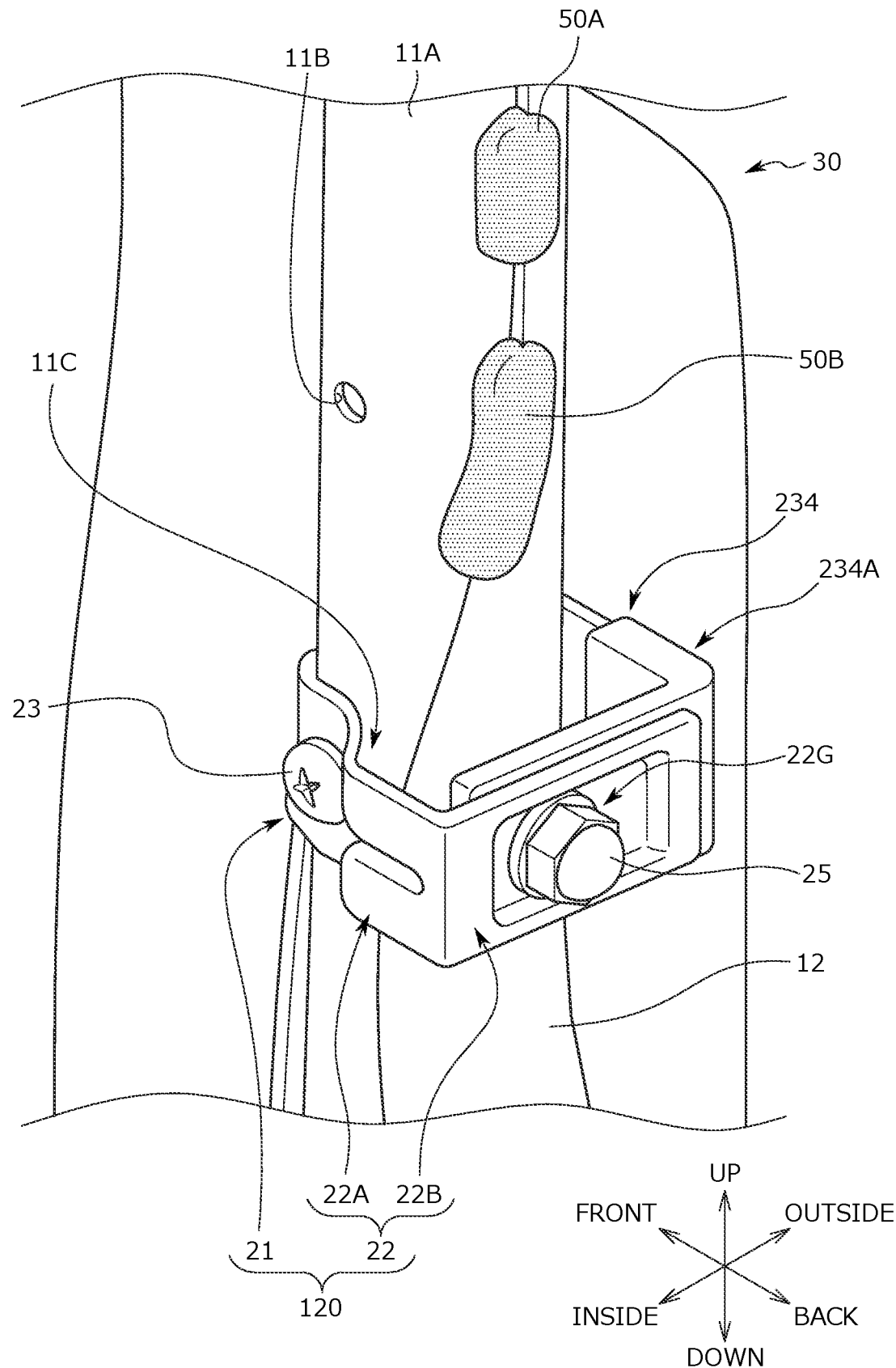
FIG. 18 is an enlarged view of a position in which an airbag module is attached to a pipe frame in a vehicle seat according to a modified example of the present invention.

That is, as illustrated in FIG. 18, the bracket 120 is different from the bracket 20 in that the outer extension portion 22B of the bracket 120 is provided with not the notch portion 22C but a through-hole 22G. Additionally, since the vehicle seat S according to the modified example has a common point with the above-described embodiment in other points, a description of the common points is omitted.

Here, an operation of attaching the bracket 120 and the retainer 234 of the vehicle seat S according to the modified example will be described.

First, the bolt 24 fixed to the retainer 234 is inserted to the through-hole 22G formed in the outer extension portion 22B of the bracket 120 toward the seat back side. Then, the cap nut 25 is fitted and fastened to the end portion 24A of the bolt 24. Accordingly, the bracket 120 and the retainer 234 are fixed.

Also in the vehicle seat S according to the modified example, since the retainer 234 of the airbag module 30 can be assembled to the side frame 13 from the seat back side, workability can be improved.

Further, in the above-described embodiment, the bracket 20 is attached to the pipe frame 11 by the screw 23, but the bracket 20 may be attached to the pipe frame 11 by welding. Additionally, various welding methods such as arc welding and laser welding may be used for welding.

Further, a method of fixing the bracket 20 and the retainer 234 is not limited to the above-described embodiment.

For example, the bracket 20 and the retainer 234 may be fixed by welding the back protrusion portion 22 of the bracket 20 and the bolt 24 integrated with the retainer 234.

Further, for example, the retainer 234 and the bracket 20 may be fixed, by fitting a push nut to the rod, in a state where the retainer 234 is provided with a rod which protrudes from the inner extension portion 234A backward and the rod is inserted through the notch portion 22C of the back protrusion portion 22.

The vehicle seat according to the present invention is a vehicle seat including a side frame which constitutes a side portion of a seat back frame, an airbag module which includes a retainer attached to the side frame, and a bracket which connects the side frame and the airbag module, the bracket includes an outer extension portion which is provided behind the side frame and extends toward a seat outer side, the outer extension portion is provided with a notch portion which is formed from an end portion on the seat outer side toward a seat inner side, the retainer includes an inner extension portion which extends toward the seat inner side, and the inner extension portion and the outer extension portion are fixed by using an attachment portion inserted through the notch portion.

According to the above-described vehicle seat, it is possible to assemble the airbag module from the seat back side. Further, it is possible to simply attach the airbag module to the side frame in the inner direction of the seat. Further, it is possible to prevent the airbag module from being separated from the side frame even when a shock is applied in the inner direction of the seat and the up to down direction of the seat after the airbag module is attached to the side frame.

Further, in the above-described vehicle seat, the inner extension portion is disposed behind the outer extension portion.

In this way, it is possible to perform an operation of fixing the bracket and the retainer from the back side of the bracket.

Further, in the above-described vehicle seat, the retainer includes a front extension portion which is connected to the inner extension portion and extends toward the seat front side and the front extension portion is attached to the side frame.

In this way, it is possible to attach the retainer to the side frame at two surfaces. For this reason, it is possible to improve the attachment rigidity of the retainer and the side frame.

Further, in the above-described vehicle seat, the bracket is attached to a side surface of the side frame on the seat inner side.

In this way, it is possible to obtain a compact width of the attachment portion of the airbag module in the right and left direction.

Further, in the above-described vehicle seat, the retainer includes the attachment portion and the attachment portion includes a portion which protrudes from the inner extension portion backward.

In this way, it is possible to easily perform an operation of fixing the bracket and the retainer to each other.

Further, in the above-described vehicle seat, the bracket is fixed to the retainer by a bolt inserted through the notch portion and a nut threaded to the bolt.

In this way, the retainer is fixed to the bracket attached to the side frame by using the bolt and the nut. Accordingly, it is possible to easily perform an operation of attaching the retainer to the side frame.

In the above-described vehicle seat, the nut is a cap nut which covers an end portion of the bolt.

In this way, since the end portion of the bolt is covered by the cap nut, it is possible to prevent the seat inner portion from being damaged by the end portion of the bolt.

Further, in the above-described vehicle seat, the outer extension portion is provided with a bead formed in the periphery of the notch portion.

In this way, it is possible to prevent the bolt from being separated from the notch portion of the retainer even when a force is applied to the retainer in the outer direction of the seat after the retainer is attached to the side frame. Accordingly, it is difficult to separate the retainer and the side frame which are fixed to each other.

Further, in the above-described vehicle seat, the airbag module includes the retainer, the airbag, the inflator supplying a gas to the airbag, and the casing covering the retainer, the airbag, and the inflator and the retainer is exposed from a gap between the upper end and the lower end of the casing.

In this way, it is possible to improve the rigidity in the periphery of the attachment portion with the side frame in the retainer.

Further, it is preferred that the above-described vehicle seat includes the seat back pad which is placed on the seat back frame and the seat back pad includes the storage portion which is opened in the side portion toward the seat outer side and stores the airbag module.

In this way, it is possible to obtain the airbag module in a compact size.

Further, it is preferred that, in the above-described vehicle seat, the side frame includes a cylindrical pipe frame and a plate-shaped plate frame attached to a lower portion of the pipe frame, and the airbag module is attached to a side surface of the plate frame on a seat outer side.

In this way, it is possible to attach the airbag module to both of the bracket and the side surface of the plate frame on the seat outer side. Accordingly, it is possible to strongly attach the airbag module to the seat cushion frame as compared with a case in which the airbag module is attached to any one of the bracket and the plate frame.

REFERENCE SIGNS LIST

S: VEHICLE SEAT
  S1: SEAT BACK
  S2: SEAT CUSHION
  S3: HEADREST
1: SEAT BACK PAD
  1A: STORAGE PORTION
2: SKIN
10: SEAT BACK FRAME
11: PIPE FRAME
  11A: SIDE PORTION
  11B: THROUGH-HOLE
  11C: THROUGH-HOLE
12: PLATE FRAME
  12A: OUTER SURFACE
13: SIDE FRAME
14: CROSS MEMBER
15: LOWER FRAME
  15A: FRONT WALL PORTION
  15B: BACK WALL PORTION
20: BRACKET
21: ATTACHMENT PORTION
  21A: INNER BENT PORTION
22: BACK PROTRUSION PORTION
  22A: BACK EXTENSION PORTION
  22B: OUTER EXTENSION PORTION
  22C: NOTCH PORTION
  22D: END OPENING PORTION
  22E: CENTER OPENING PORTION
  22F: BEAD PORTION
  22G: THROUGH-HOLE
23: SCREW
24 BOLT
  24A: END PORTION
25: CAP NUT
30: AIRBAG MODULE
31: AIRBAG
32: INFLATOR
33 CASING
34 RETAINER
  34A: PROTRUSION PORTION
  34B: INNER EXTENSION PORTION
  34C: OPENING PORTION
  34D: FLAT PLATE PORTION
35 HARNESS
  36A: STUD BOLT
  36B: STUD BOLT
37 NUT
38 PIPE
40: AIRBAG MODULE
41: SIDE PLATE
42: SCREW
  50A: WELDED PORTION
  50B: WELDED PORTION
60: WEBBING CLIP
120: BRACKET
  134A: FIRST EXTENSION PORTION
  134B: SECOND EXTENSION PORTION
  134C: NOTCH PORTION
  134D: END OPENING PORTION
  134E: CENTER OPENING PORTION
  134F: BEAD PORTION
  134G: FIRST THROUGH-HOLE
  134H: SECOND THROUGH-HOLE
234: RETAINER
  234A: INNER EXTENSION PORTION
  234B: FRONT EXTENSION PORTION
  234C: FIRST THROUGH-HOLE
  234D: SECOND THROUGH-HOLE

The invention claimed is:

1. A vehicle seat comprising:
a side frame which constitutes a side portion of a seat back frame;
a bracket which includes
an attachment portion attached to an inner side surface of the side frame in a seat width direction, the attachment portion having an inner bent portion that is provided at a rear end of the attachment portion and is bent inward in the seat width direction, and
a back protrusion portion protruding backward from the inner bent portion of the attachment portion; and
an airbag module which is fixed to the back protrusion portion.

2. The vehicle seat according to claim 1,
wherein the side frame includes a cylindrical pipe frame and a plate-shaped plate frame attached to a lower portion of the pipe frame, and
wherein the airbag module is attached to a side surface of the plate frame on a seat outer side.

3. The vehicle seat according to claim 2,
wherein the bracket is attached to a lower portion in relation to a joint portion between the pipe frame and the plate frame in the pipe frame.

4. The vehicle seat according to claim 1,
wherein the back protrusion portion includes a back extension portion which extends backward from the inner bent portion of the attachment portion and an outer extension portion which extends from the back extension portion toward a seat outer side, and
wherein the airbag module is attached to the outer extension portion.

5. The vehicle seat according to claim 4,
wherein the airbag module includes an airbag, an inflator which supplies a gas to the airbag, a casing which covers the inflator and the airbag, and a retainer including a protrusion portion which protrudes from the casing, and
wherein the outer extension portion of the bracket and the protrusion portion of the retainer are fixed to each other.

6. The vehicle seat according to claim 5,
wherein the outer extension portion of the bracket and the protrusion portion of the retainer are fixed by fastening a nut to a bolt penetrating both portions, and
wherein the protrusion portion of the retainer is provided with an opening portion through which the bolt is inserted.

7. The vehicle seat according to claim 6,
wherein the protrusion portion of the retainer includes an inner extension portion which is provided on a back side of the side frame to extend toward the inner side of the seat, and
wherein the inner extension portion and the outer extension portion are fixed.

8. The vehicle seat according to claim 7,
wherein an end portion of the bolt faces backward, and
wherein the nut is a cap nut which covers the end portion of the bolt.

9. The vehicle seat according to claim 7,
wherein the opening portion of the retainer is provided across an end portion on the inner side of the seat.

10. The vehicle seat according to claim 1, further comprising:
a seat back pad which covers the seat back frame,
wherein the seat back pad includes a storage portion which is opened in the side portion toward a seat outer side and stores the airbag module.

* * * * *